US010699224B2

(12) United States Patent
Mizumoto et al.

(10) Patent No.: US 10,699,224 B2
(45) Date of Patent: Jun. 30, 2020

(54) CONVERSATION MEMBER OPTIMIZATION APPARATUS, CONVERSATION MEMBER OPTIMIZATION METHOD, AND PROGRAM

(71) Applicant: HONDA MOTOR CO., LTD., Tokyo (JP)

(72) Inventors: Takeshi Mizumoto, Wako (JP); Shunichi Hagiya, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 207 days.

(21) Appl. No.: 15/645,007

(22) Filed: Jul. 10, 2017

(65) Prior Publication Data
US 2018/0075395 A1 Mar. 15, 2018

(30) Foreign Application Priority Data
Sep. 13, 2016 (JP) .................................. 2016-178532

(51) Int. Cl.
*G06Q 10/00* (2012.01)
*G06Q 10/06* (2012.01)
(Continued)

(52) U.S. Cl.
CPC ..... *G06Q 10/063114* (2013.01); *G06Q 10/04* (2013.01); *G10L 15/14* (2013.01);
(Continued)

(58) Field of Classification Search
None
See application file for complete search history.

(56) References Cited

U.S. PATENT DOCUMENTS 4,931,934 A * 6/1990 Snyder .................. G09B 19/00
434/236
5,025,471 A * 6/1991 Scott ....................... G10L 15/02
704/237

(Continued)

FOREIGN PATENT DOCUMENTS

JP 2009-163431 A 7/2009
JP 2011-076480 A 4/2011
(Continued)

OTHER PUBLICATIONS

Chelba, Ciprian, Speech Utterance Classification, Conference Paper in Acoustics, Speech, and Signal Processing, 1988. ICASSP-88., 1988 International Conference on • May 2003 , May 2003, https://www.researchgate.net/publication/4015064_Speech_utterance_classification, p. 1-5.*

(Continued)

*Primary Examiner* — Joseph M Waesco
(74) *Attorney, Agent, or Firm* — Rankin, Hill & Clark LLP

(57) ABSTRACT

A conversation member optimization apparatus includes: a conversation analyzing unit configured to recognize sound signals in a plurality of conferences held in the past for each conference and analyze conversations in the conferences for each conference; an estimating unit configured to estimate feature quantities in combinations of the members who participate in the conferences to be held on the basis of results analyzed by the conversation analyzing unit and in accordance with a member selecting instruction used to select members who participate in conferences to be held; and a member selecting unit configured to select the members on the basis of the results estimated by the estimating unit.

4 Claims, 11 Drawing Sheets

(51) Int. Cl.
*G06Q 10/04* (2012.01)
*G10L 15/14* (2006.01)
*G10L 15/22* (2006.01)
*G06F 16/901* (2019.01)
*G06F 17/16* (2006.01)

(52) U.S. Cl.
CPC ........ *G10L 15/222* (2013.01); *G06F 16/9024* (2019.01); *G06F 17/16* (2013.01); *G06Q 10/06315* (2013.01)

(56) References Cited

U.S. PATENT DOCUMENTS

| | | | | |
|---|---|---|---|---|
| 5,230,037 | A * | 7/1993 | Giustiniani | G10L 15/14 704/200 |
| 5,862,519 | A * | 1/1999 | Sharma | G10L 15/04 704/231 |
| 6,011,851 | A * | 1/2000 | Connor | H04S 1/002 379/202.01 |
| 6,151,571 | A * | 11/2000 | Pertrushin | G10L 17/26 704/207 |
| 6,480,826 | B2 * | 11/2002 | Pertrushin | G10L 17/26 704/270 |
| 7,222,075 | B2 * | 5/2007 | Petrushin | G10L 17/26 379/88.01 |
| 7,475,013 | B2 * | 1/2009 | Rifkin | G10L 17/02 382/215 |
| 7,843,486 | B1 * | 11/2010 | Blair | H04M 3/568 348/14.01 |
| 7,930,181 | B1 * | 4/2011 | Goffin | G10L 15/02 704/231 |
| 8,666,672 | B2 * | 3/2014 | Winarski | A61B 5/16 702/19 |
| 8,681,203 | B1 * | 3/2014 | Yin | H04N 7/15 348/14.08 |
| 8,965,770 | B2 * | 2/2015 | Petrushin | G10L 17/26 704/270 |
| 9,355,636 | B1 * | 5/2016 | O'Neill | G10L 15/142 |
| 9,378,729 | B1 * | 6/2016 | Salvador | G10L 15/02 |
| 2002/0161579 | A1 * | 10/2002 | Saindon | G06F 40/58 704/235 |
| 2005/0246165 | A1 * | 11/2005 | Pettinelli | G10L 15/1807 704/207 |
| 2006/0095268 | A1 * | 5/2006 | Yano | G10L 15/22 704/275 |
| 2007/0071206 | A1 * | 3/2007 | Gainsboro | H04M 3/2281 379/168 |
| 2007/0143103 | A1 * | 6/2007 | Asthana | H04M 3/567 704/200 |
| 2009/0018828 | A1 * | 1/2009 | Nakadai | G10L 15/20 704/234 |
| 2010/0223056 | A1 * | 9/2010 | Kadirkamanathan | G10L 15/02 704/235 |
| 2010/0262419 | A1 * | 10/2010 | De Bruijn | G10L 15/1822 704/9 |
| 2010/0283829 | A1 * | 11/2010 | De Beer | G06F 40/58 348/14.09 |
| 2011/0161076 | A1 * | 6/2011 | Davis | G06F 3/04842 704/231 |
| 2011/0246172 | A1 * | 10/2011 | Liberman | H04N 7/152 704/2 |
| 2011/0285807 | A1 * | 11/2011 | Feng | G06K 9/00228 348/14.08 |
| 2011/0285808 | A1 * | 11/2011 | Feng | H04N 7/142 348/14.09 |
| 2012/0035927 | A1 * | 2/2012 | Yamada | G06K 9/00228 704/242 |
| 2012/0053936 | A1 * | 3/2012 | Marvit | G10L 15/26 704/235 |
| 2012/0185244 | A1 * | 7/2012 | Morita | G10L 25/93 704/207 |
| 2013/0035939 | A1 * | 2/2013 | Gilbert | G10L 15/063 704/254 |
| 2013/0216206 | A1 * | 8/2013 | Dubin | H04N 9/87 386/282 |
| 2013/0226850 | A1 * | 8/2013 | Hannuksela | G10L 25/48 706/14 |
| 2014/0082100 | A1 * | 3/2014 | Sammon | G06Q 10/101 709/206 |
| 2014/0147816 | A1 * | 5/2014 | Ferro | G09B 5/065 434/157 |
| 2014/0163991 | A1 * | 6/2014 | Short | G10L 21/0272 704/258 |
| 2014/0258413 | A1 * | 9/2014 | Brieskorn | H04M 3/42221 709/204 |
| 2014/0277735 | A1 * | 9/2014 | Breazeal | B25J 9/0003 700/259 |
| 2014/0337023 | A1 * | 11/2014 | McCulloch | G06F 1/163 704/235 |
| 2014/0372362 | A1 * | 12/2014 | Miller | G06F 17/00 706/50 |
| 2015/0002611 | A1 * | 1/2015 | Thapliyal | G10L 25/84 348/14.08 |
| 2015/0012270 | A1 * | 1/2015 | Reynolds | G10L 21/0272 704/233 |
| 2015/0154957 | A1 * | 6/2015 | Nakadai | G10L 15/26 704/235 |
| 2015/0312518 | A1 * | 10/2015 | Reynolds | G10L 25/87 348/14.08 |
| 2016/0217807 | A1 * | 7/2016 | Gainsboro | H04M 3/2281 |
| 2016/0300252 | A1 * | 10/2016 | Frank | G06Q 30/0203 |
| 2017/0270930 | A1 * | 9/2017 | Ozmeral | G10L 17/005 |

FOREIGN PATENT DOCUMENTS

| | | |
|---|---|---|
| JP | 2013-246501 A | 12/2013 |
| JP | 2014-527651 A | 10/2014 |
| JP | 5814490 B1 | 11/2015 |
| JP | 2016-012216 | 1/2016 |
| WO | 2010/113614 A1 | 10/2010 |
| WO | 2013/003961 A2 | 1/2013 |

OTHER PUBLICATIONS

Japanese Office Action with English translation, dated Oct. 15, 2019, 3 pages.

* cited by examiner

FIG. 2

|  | 1 | 2 | 3 | 4 | 5 | ... | N |
|---|---|---|---|---|---|---|---|
| IDENTIFICATION NUMBER | ID1 | ID2 | ID3 | ID4 | ID5 | ... | IDN |
| INFORMATION ON ORGANIZATION TO WHICH HE OR SHE BELONGS |  |  |  |  |  |  |  |

FIG. 3

| MEMBER | AMOUNT OF UTTERANCES |
|---|---|
| ID1 | $a_1$ |
| ID3 | $a_3$ |
| ID5 | $a_5$ |
| ID6 | $a_6$ |
| ID9 | $a_9$ |

FIG. 4
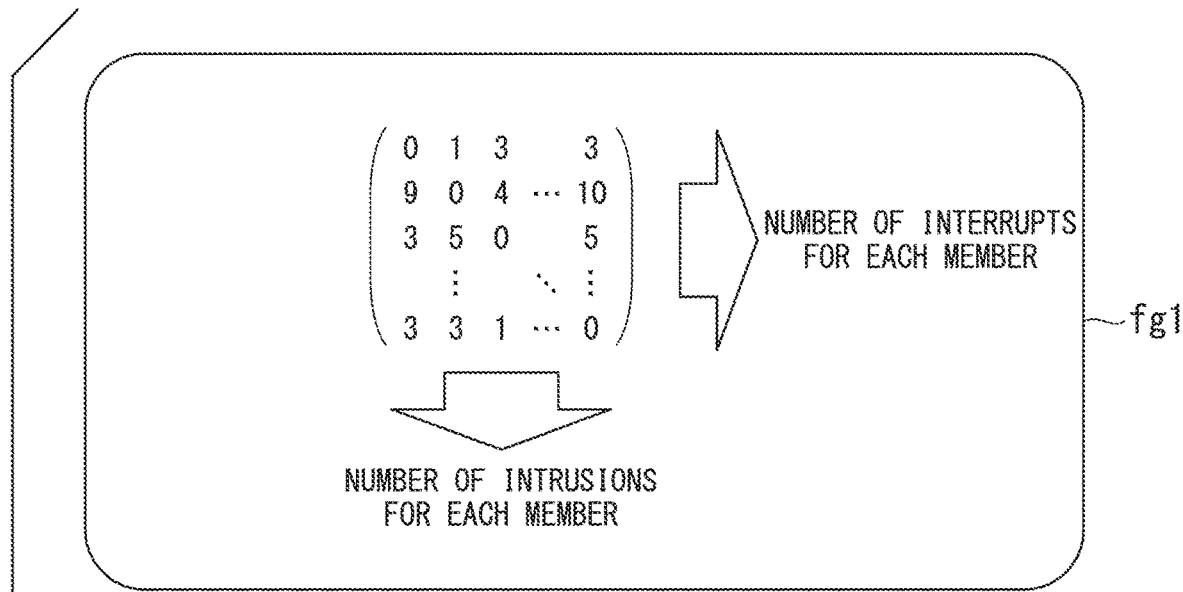
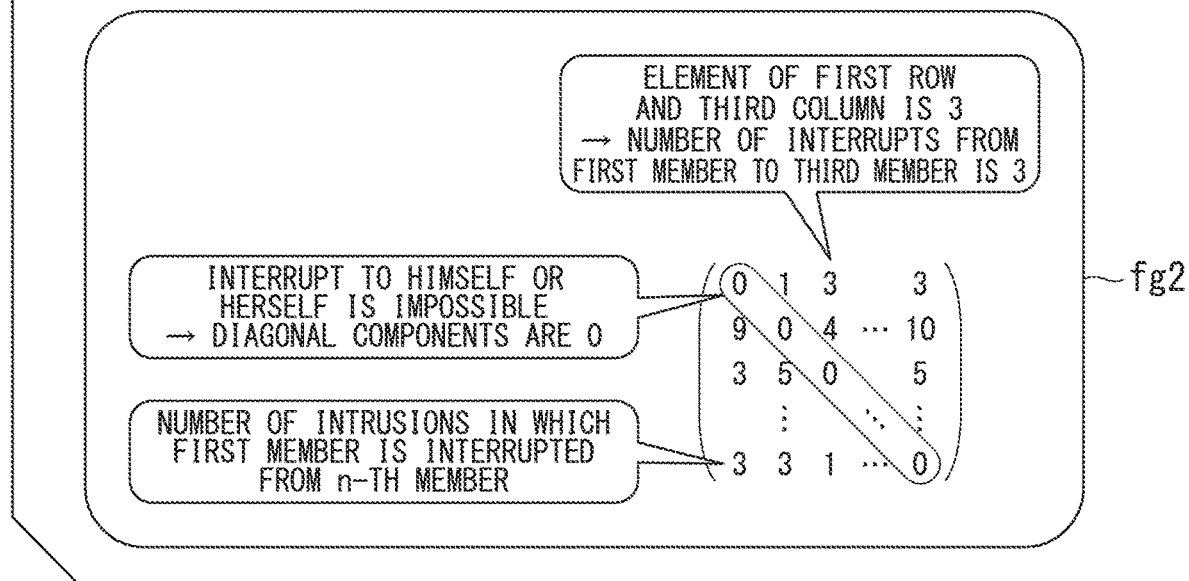

CONVERSATION MEMBER OPTIMIZATION APPARATUS, CONVERSATION MEMBER OPTIMIZATION METHOD, AND PROGRAM

CROSS-REFERENCE TO RELATED APPLICATION

Priority is claimed on Japanese Patent Application No. 2016-178532, filed Sep. 13, 2016, the content of which is incorporated herein by reference.

BACKGROUND OF THE INVENTION

Field of the Invention

The present invention relates to a conversation member optimization apparatus, a conversation member optimization method, and a program.

Description of Related Art

Methods of objectively evaluating a degree of activeness in all conversations as part of the situation of conducting conversations by detecting utterance amounts, specific keyword utterances and the like in conversations between a plurality of participants have been suggested. For example, Japanese Unexamined Patent Application, First Publication No. 2016-12216 (hereinafter referred to as Patent Literature 1) discloses a conference analysis device in which feature quantities are extracted as a time series from conference data as a conference progresses and a degree of activeness is calculated as a time series as the conference progresses on the basis of the feature quantities. The conference analysis device corrects the degree of activeness throughout the conference in consideration of a reference degree of activeness for all conference participants. Furthermore, the conference analysis device corrects a degree of activeness for each discussed section of a topic in consideration of a reference degree of activeness in some conference participants using a topic in which some of the participants are participating during the discussion as an object. The degree of activeness for each discussed section of the topic is corrected in consideration of the reference degree of activeness of those participants. Moreover, the conference analysis device corrects the degree of activeness for each utterance section of the participants in the conference on the basis of the characteristics of the participants and the utterance content.

SUMMARY OF THE INVENTION

However, although the technique disclosed in Cited Document 1 can objectively measure a degree of activeness or the like in a conversation between predetermined members, degrees of activeness or the like of members other than the predetermined members cannot be estimated. For this reason, the technique disclosed in Cited Document 1 cannot estimate a constitution of members for the purpose of increasing activeness in a conversation in discussions such as conferences at companies and classes at schools or the like.

An aspect of the present invention was made in view of the above-described circumstances and an objective of the present invention is to provide a conversation member optimization apparatus, a conversation member optimization method, and a program which estimate a constitution of members for the purpose of increasing activeness in a conversation.

In order to accomplish the above-described objective, the present invention adopts the following aspects.

(1) A conversation member optimization apparatus related to an aspect of the present invention includes: a conversation analyzing unit configured to recognize sound signals in a plurality of conferences held in the past for each conference and analyze conversations in the conferences for each conference; an estimating unit configured to estimate feature quantities in combinations of the members who will participate in a conference to be held on the basis of results analyzed by the conversation analyzing unit and in accordance with a member selecting instruction used to select members to participate in the conference to be held; and a member selecting unit configured to select the members on the basis of the results estimated by the estimating unit.

(2) In the aspect of (1), types indicating dominance relationships between the members who participate in the conferences may be stored, and the member selecting unit may select the members to match desired types.

(3) In the aspect of (1) or (2), the feature quantities may include at least one of an amount of conditional utterances serving as an amount of utterances according to a combination of one member and another member, an interrupt matrix indicating whether another member interrupts and one member speaks, and activity probability serving as probability of another member speaking after one member.

(4) In the aspect of any one of (1) to (3), the member selecting instruction includes the total number of participating members in the conference to be held and determination information indicating at least one member who is determined to participate in advance among participating members in the conference to be held.

(5) In the aspect of (3), the member selecting instruction may include the total number of participating members in the conference to be held and determination information indicating at least one member who is determined to participate in advance among participating members in the conference to be held, and members other than the member who is determined to participate in advance may be candidates for selectable members, and the estimating unit may repeatedly perform selection until the one member among the members who are the candidates is included in the total number of participating members in the conference to be held so that the amount of conditional utterances when participating members in the conference to be held are combined with members who are candidates to be selected are combined one by one is maximized.

(6) In the aspect of (3), the member selecting instruction may include the total number of participating members in the conference to be held and determination information indicating at least one member who is determined to participate in advance among participating members in the conference to be held, members other than the member who is determined to participate in advance may be candidates for selectable members, and the estimating unit may repeatedly perform selection until the one member among the members who are the candidates is included in the total number of participating members in the conference to be held so that the amounts of conditional utterances when participating members in the conference to be held are combined with members who are candidates to be selected are combined one by one and sums of values obtained by converting the interrupt matrix into scalar values and values obtained by converting the activity probability into scalar values are maximized.

(7) In the aspect of (3), the member selecting instruction may include the total number of participating members in the conference to be held and determination information indicating at least one member who is determined to participate in advance among participating members in the conference to be held, members other than the member who is determined to participate in advance may be candidates for selectable members, wherein the estimating unit may select a member for whom the values obtained by converting the interrupt matrix into the scalar values when participating members in the conference to be held are combined with members who are candidates to be selected are combined one by one are a first threshold value or more, select a member for whom the values obtained by converting the activity probability into the scalar values when participating members in the conference to be held are combined with members who are candidates to be selected are combined one by one are a second threshold value or more, and select a member for whom the amounts of conditional utterances when participating members in the conference to be held are combined with members who are candidates to be selected are combined one by one are a third threshold value or more, and wherein the member selecting unit may repeatedly perform selection until the one member among the members who are the candidates is included in the total number of participating members in the conferences to be held on the basis of the results selected by the estimating unit.

(8) In the aspect of (6) or (7), the estimating unit may select a function used for converting the interrupt matrix into scalar values in accordance with selection conditions included in the member selecting instruction when the interrupt matrix is converted into the scalar values.

(9) A conversation member optimization method related to an aspect of the present invention includes: a conversation analysis step of recognizing, by a conversation analyzing unit, sound signals in a plurality of conferences held in the past for each conference and analyzing conversations in the conferences for each conference; an estimation step of estimating, by an estimating unit, feature quantities in combinations of the members who will participate in a conference to be held on the basis of results analyzed in the conversation analysis step and in accordance with a member selecting instruction used to select members to participate in the conference to be held; and a member selection step of selecting, by a member selecting unit, the member on the basis of the results estimated in the estimation step.

(10) A program related to an aspect of the present invention causes a computer to execute: a conversation analysis step of recognizing sound signals in a plurality of conferences held in the past for each conference and analyzing conversations in the conferences for each conference; an estimation step of estimating feature quantities in combinations of members who will participate in a conference to be held on the basis of results analyzed in the conversation analysis step and in accordance with a member selecting instruction used to select members to participate in the conference to be held; and a member selection step of selecting the member on the basis of the results estimated in the estimation step.

According to the aspect of (1), (9), or (10), members of a conference to be held are selected from results of analyzing utterances in a conference held in the past on the basis of the results. Thus, according to the aspect of (1), (8), or (9), a constitution of members for the purpose of increasing activeness of a conversation in the conference to be held can be estimated.

In the case of (2), members of a conference to be held are selected to match a type indicating a dominance relationship between members who participate in a conference. Thus, in the case of (2), intended members in a conference can be selected. Note that examples of intention in a conference include a one-dominator type with a relationship in which a leader dominates other members, a one-member-dominated type in which other members dominate a leader, a dominator-dominated member type in which there are combinations of dominators and members to be dominated among members, a no-dominator type in which members dominate each other, and the like.

In the case of (3), members in the conference to be held are selected on the basis of at least one estimated result of an amount of conditional utterances, an interrupt matrix, and activity probability (a turn take probability). Thus, in the case of (3), members can be selected by regarding items (an amount of conditional utterances, an interrupt matrix, and activity probability) desired by a user (for example, a host and a leader in a conference to be held) to be the most important.

In the case of (4), at least one member among members to participate in a conference to be held is determined. Thus, in the case of (4), an amount of calculation for the purpose of selecting a member can be reduced.

In the case of (5), members with the highest amount of utterances are sequentially selected. Thus, in the case of (5), members who are estimated to speak actively can be selected.

In the case of (6), members with the highest amount of utterances, interruptions of utterances, and activity (turn taking) are sequentially selected. Thus, in the case of (5), members who are estimated to speak actively, to interrupt actively, and to perform turn-taking actively can be selected.

In the case of (7), members with threshold values corresponding to an amount of utterances, interruptions of utterances, and activity (turn-taking) are sequentially selected. Thus, in the case of (6), members who are estimated to speak actively, to interrupt actively, and to perform turn-taking actively can be selected.

In the case of (8), members for whom selection conditions performed by the user are regarded to be the most important can be selected. Note that examples of selection conditions include minimizing interruptions and reducing a ratio at which unique members are interrupted.

BRIEF DESCRIPTION OF THE DRAWINGS

FIG. 2 is a diagram illustrating an example of information indicating members who can participate in a conference to be held stored in a conference data storing unit according to the embodiment.

FIG. 3 is a diagram illustrating an example of an amount of utterances for each member stored in the conference data storing unit according to the embodiment.

FIG. 4 is a diagram illustrating an example of an interrupt matrix according to the embodiment.

DETAILED DESCRIPTION OF THE INVENTION

<Overview of Conversation Member Optimization Apparatus>

First, an overview of a conversation member optimization apparatus will be described.

A conversation member optimization apparatus acquires sound signals of a conference held in the past and identifies and analyzes the acquired sound signals to analyze conversation content of a conference. Furthermore, the conversation member optimization apparatus analyzes whether an amount of utterances increases when a member is participating in a conference and analyzes an order in which members interrupt each other and speak among members who participate in a conference to analyze an order in which the members have spoken. The conversation member optimization apparatus selects members to participate in a conference to be held on the basis of at least one of the analyzed results.

Thus, the conversation member optimization apparatus can select a member who performs active discussion.

Hereinafter, embodiments of the present invention will be described with reference to the drawings.

<Constitution of Conversation Member Optimization Apparatus>

Figure 1:
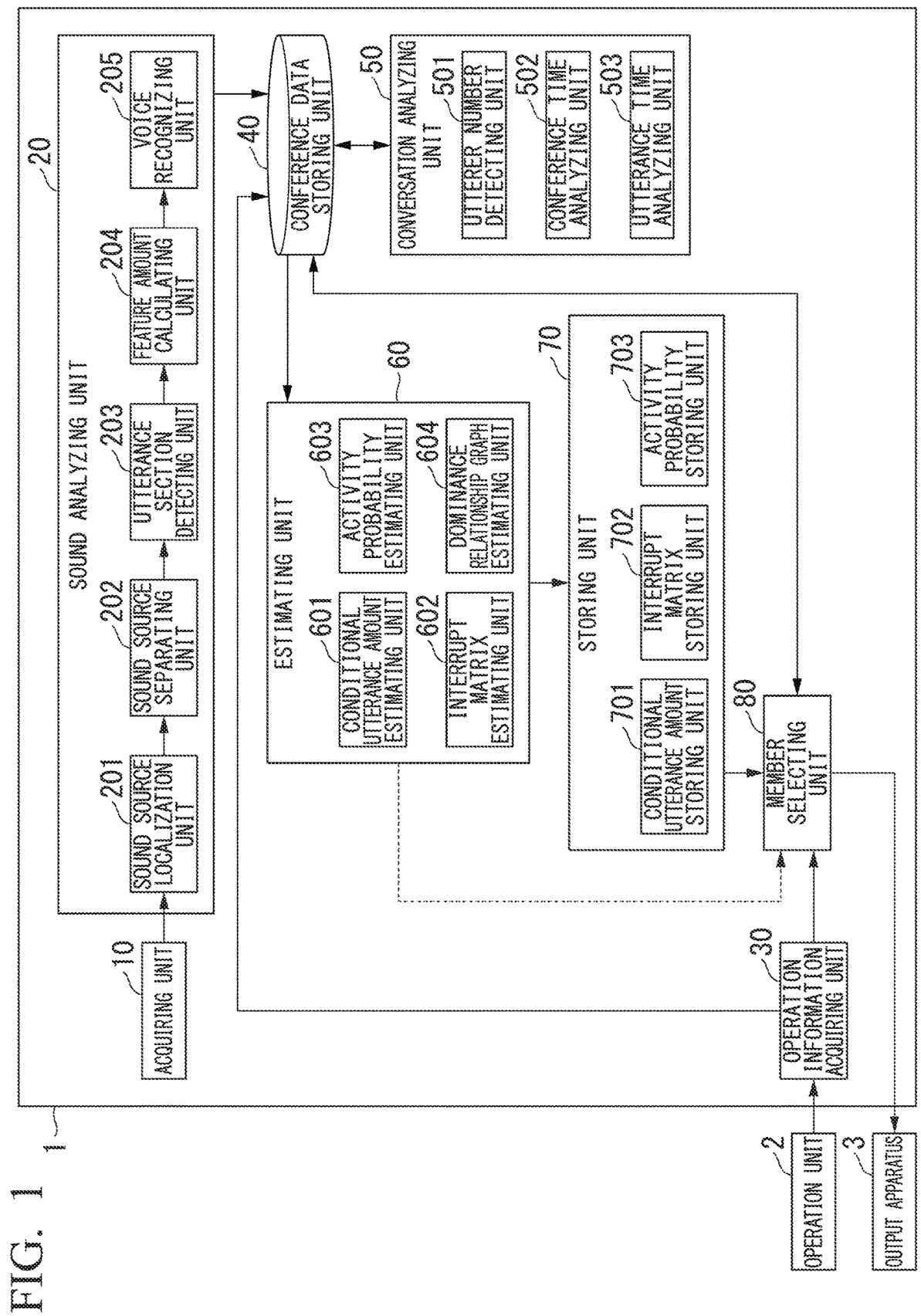
FIG. 1 is a block diagram showing a constitution of a conversation member optimization apparatus according to an embodiment.

FIG. 1 is a block diagram showing a constitution of a conversation member optimization apparatus 1 according to an embodiment.

As shown in FIG. 1, the conversation member optimization apparatus 1 includes an acquiring unit 10, a sound analyzing unit 20, an operation information acquiring unit 30, a conference data storing unit 40, a conversation analyzing unit 50, an estimating unit 60, a storing unit 70, and a member selecting unit 80. Furthermore, an operation unit 2 and an output apparatus 3 are connected to the conversation member optimization apparatus 1.

The operation unit 2 receives an operation of a user and generates operation signals according to the received operation.

The operation unit 2 outputs the generated operation signals to the conversation member optimization apparatus 1. The operation unit 2 is constituted of, for example, any of physical members such as a button and a lever and general-purpose members such as a touch sensor mouse, a keyboard or a combination thereof.

The output apparatus 3 is an apparatus configured to output selection results output by the conversation member optimization apparatus 1.

Selection results are, for example, information (for example, a name, an organization to which someone belongs, and the like) indicating members to participate in a conference to be held. The output apparatus 3 is constituted to include, for example, any of a liquid crystal display (LCD), an organic electroluminescence (EL) display, a printing apparatus, a voice output apparatus, and the like.

The acquiring unit 10 acquires acoustic signals of a conference and outputs the acquired acoustic signals to the sound analyzing unit 20. Here, acoustic signals are acoustic signals of a P channel (here, P is an integer of 1 or more) and are signals obtained by recording utterances of M members, who participate in one conference, in the conference. Note that the acquiring unit 10 may be a Universal Serial Bus (USB) terminal which can acquire acoustic signals.

The sound analyzing unit 20 includes a sound source localization unit 201, a sound source separating unit 202, an utterance section detecting unit 203, a feature amount detecting unit 204, and a voice recognizing unit 205.

The sound analyzing unit 20 stores voice recognized results for each conference in the conference data storing unit 40 on the basis of sound signals of a P channel output by the acquiring unit 10. Voice recognized results for each conference include, for example, a date and time at which a conference is held, a conference name, utterance content (a text format) for each member serving as a speaker, an utterance start time and an utterance end time for each member and for each utterance, information indicating members who participated in a conference, and the like.

The sound source localization unit 201 calculates a direction for each sound source for each time with a predetermined length (for example, 50 ms) on the basis of sound signals of a P channel (P is an integer of 1 or more) output by the acquiring unit 10.

The sound source localization unit 201 uses, for example, a multiple signal classification (MUSIC) method in calculating a sound source direction. The sound source localization unit 201 outputs sound source direction information indicating the calculated sound source direction for each sound source and sound signals of a P channel to the sound source separating unit 202.

The sound signals of the P channel and the sound source direction information output by the sound source localization unit 201 are input to the sound source separating unit 202. The sound source separating unit 202 separates the sound signals of the P channel into sound-source-specific sound signals for a sound source on the basis of a sound source direction indicated by the sound source direction information. The sound source separating unit 202 uses, for example, a geometric-constrained high-order decorrelation-based source separation (GHDSS) method in separating the sound signals. The sound source separating unit 202 outputs the separated sound-source-specific sound signals for each sound source to the utterance section detecting unit 203. Speakers are handled as sound sources generating sounds through utterances.

In other words, sound-source-specific sound signals are sound signals indicating utterances representing sounds spoken by speakers.

The utterance section detecting unit 203 detects an utterance section for each section with a predetermined time interval from the sound-source-specific sound signals for each speaker output by the sound source separating unit 202. The utterance section detecting unit 203 performs voice section detection (voice activity detection: VAD) using, for example, a zero crossing method, a spectral entropy method, or the like in specifying the utterance section. The utterance section detecting unit 203 determines a section specified as a voice section to be an utterance section and generates utterance section data indicating whether the section is an utterance section for each speaker. The utterance section detecting unit 203 associates the utterance section data with the sound-source-specific sound signals for each utterance section and outputs the associations to the feature amount detecting unit 204.

Utterance section data and sound-source-specific sound signals for each speaker output by the utterance section detecting unit 203 are input to the feature amount detecting unit 204. The feature amount detecting unit 204 calculates acoustic feature quantities of sound signals within utterance sections for each predetermined time interval (for example, 10 ms) with reference to the utterance section data. Acoustic feature quantities include, for example, a $13^{th}$ Mel-scale logarithmic spectrum (MSLS). A 13th delta MSLS or delta power may be included in a set of acoustic feature quantities. A delta MSLS is a difference between an MSLS of a frame (current time) at that point in time and an MSLS of an immediately previous frame (previous time). Delta power is a difference between power at a current time and power at a previous time. Acoustic feature quantities are not limited thereto and may be, for example, Mel-frequency cepstrum coefficients (MFCCs). The feature amount detecting unit 204 associates the calculated acoustic feature quantities and utterance section data for each utterance section and outputs the associations to the voice recognizing unit 205.

The voice recognizing unit 205 performs a voice recognizing process on the acoustic feature quantities output by the feature amount detecting unit 204 using voice recognition data stored in the conference data storing unit 40 in advance and generates text data indicating utterance content. Examples of voice recognition data include an acoustic model, a language model, and a word dictionary as data used for a voice recognizing process. An acoustic model includes data used when phonemes are recognized from acoustic feature quantities. A language model is data used when one word or a set of a plurality of words are recognized from a phoneme string constituted of one phoneme or a plurality of phonemes adjacent to each other. A word dictionary is data indicating words serving as candidates for a phoneme string.

One or a set of a plurality of recognized words are represented by text data as recognized data. An acoustic model is, for example, a continuous hidden Markov model (HMM). A continuous HMM is a model obtained by converting a power distribution density into a continuous function and is represented by performing weighted addition on the power distribution density on the basis of a plurality of normal distributions. A language model is, for example, an N gram indicating a constraint of a phoneme string including a phoneme subsequent to a certain phoneme and transition probability for each phoneme string.

The voice recognizing unit 205 associates text data and utterance section data generated for each sound source, that is, speaker, for each utterance section of each speaker and generates conversation data. The voice recognizing unit 205 stores the conversation data generated for each speaker in the conference data storing unit 40.

Note that the sound analyzing unit 20 may include only the utterance section detecting unit 203, the feature amount detecting unit 204, and the voice recognizing unit 205. In the case of a conference, members speak one by one in many cases. Thus, the sound analyzing unit 20 may estimate a speaker on the basis of feature quantities of sound signals detected for each utterance section.

The operation information acquiring unit 30 acquires operation signals output by the operation unit 2. The operation information acquiring unit 30 extracts information (a name, an identifier, and the like) indicating the number of members to participate in a conference to be held or a member who is determined to participate in a conference in advance (hereinafter referred to as a "determined member") from the acquired operation signals. The operation information acquiring unit 30 outputs the extracted number of members to participate in the conference to be held, determined members, and the like to the member selecting unit 80 and stores the extracted number of members to participate in the conference to be held, the determined members, and the like in the conference data storing unit 40.

The conference data storing unit 40 stores voice recognition data, feature quantities of sound signals for each member who can participate in a conference, and the like in advance. The number of members to participate in a conference to be held, information indicating determined members, a list of members whose participation in a conference is desired, and the like are stored in the conference data storing unit 40 using the operation information acquiring unit 30. Note that the conference data storing unit 40 may store a list of members who can participate in a conference in advance. Voice recognized results for each conference are stored in the conference data storing unit 40 using the sound analyzing unit 20. Conference analysis records obtained by analyzing utterances in a conference are stored in the conference data storing unit 40 using the conversation analyzing unit 50. Furthermore, the conference data storing unit 40 stores information indicating relationships as a dominance relationship graph in advance. Note that a dominance relationship graph will be described in an embodiment.

The conversation analyzing unit 50 includes a speaker number detecting unit 501, a conference time analyzing unit 502, and a speech time analyzing unit 503.

The conversation analyzing unit 50 analyzes the number of members (speakers) and names of the members who participate in a conference, a time spent in a conference, and an amount of utterances serving as an utterance time per hour for each member for each conference on the basis of the voice recognized results stored in the conference data storing unit 40. The conversation analyzing unit 50 stores analyzed results in the conference data storing unit 40 as conference analysis records.

The speaker number detecting unit 501 estimates the number of members (speakers) who participate in a conference and names of the members for each conference on the basis of the voice recognized results stored in the conference data storing unit 40 and stores the estimated results in the conference data storing unit 40. Note that the speaker number detecting unit 501 may extract participants' names from voice recognized results to estimate members' names. Alternatively, the speaker number detecting unit 501 may compare feature quantities of sound signals for each member stored in the conference data storing unit 40 with feature quantities of sound signals of members who participate in a conference, for example, using a pattern matching method, to estimate the members' names.

The conference time analyzing unit 502 estimates a time spent in a conference for each conference on the basis of the voice recognized results stored in the conference data storing unit 40 and stores the estimated results in the conference data storing unit 40.

The speech time analyzing unit 503 estimates a total speech time for each conference and for each member on the basis of the voice recognized results stored in the conference data storing unit 40. Furthermore, the speech time analyzing unit 503 normalizes a total estimated speech time per hour and stores the normalized value in the conference data storing unit 40 as amount of utterances for each conference and for each member. Note that the speech time analyzing unit 503 may analyze the number of utterances per hour for each member as an amount of utterances.

The estimating unit 60 includes a conditional utterance amount estimating unit 601, an interrupt matrix estimating unit 602, an activity probability estimating unit 603, and a dominance relationship graph estimating unit 604.

The estimating unit 60 estimates at least one of an amount of conditional utterances, an interrupt matrix, and activity probability (turn-taking probability) and stores the estimated result in the storing unit 70. Note that the estimating unit 60 may include at least one functional unit corresponding to estimated content among the conditional utterance amount estimating unit 601, the interrupt matrix estimating unit 602, and the activity probability estimating unit 603.

The conditional utterance amount estimating unit 601 reads results analyzed by the conversation analyzing unit 50 from the conference data storing unit 40. The conditional utterance amount estimating unit 601 estimates an amount of conditional utterances for each combination of members who will participate in a conference to be held in response to an estimation instruction output by the member selecting unit 80 on the basis of the read analyzed results. Note that a method of estimating an amount of conditional utterances will be described below. The conditional utterance amount estimating unit 601 stores the estimated amount of conditional utterances in a conditional utterance amount storing unit 701 of the storing unit 70. Note that an amount of conditional utterances is a value indicating whether an amount of utterances increases (speech is actively performed) or an amount of utterances decreases depending on other participants who participate in a conference. Furthermore, an amount of utterances may be a speech time per hour.

The interrupt matrix estimating unit 602 reads results analyzed by the conversation analyzing unit 50 from the conference data storing unit 40. The conditional utterance amount estimating unit 601 estimates the number of interrupts of members in all conferences to be held and an interrupt matrix in all conferences to be held in response to an estimation instruction output by the member selecting unit 80 on the basis of the read analyzed results and stores the estimated interrupt matrix in an interrupt matrix storing unit 702. Note that a method of estimating the number of interrupts of members and an interrupt matrix will be described below. An interrupt matrix indicates an order in which members interrupt each other and speak or members who interrupt others. This matrix may include matrices concerning all members who can participate in a conference.

The activity probability estimating unit 603 reads results analyzed by the conversation analyzing unit 50 from the conference data storing unit 40. The activity probability estimating unit 603 estimates activity probability in response to an estimation instruction output by the member selecting unit 80 on the basis of the read analyzed results and stores the estimated activity probability in an activity probability storing unit 703. Note that a method of estimating activity probability will be described below. Activity probability is probability indicating an order in which members speak.

The dominance relationship graph estimating unit 604 estimates a type of a dominance relationship graph with respect to a constitution of members who participate in a conference to be held on the basis of the number of interrupts estimated by the interrupt matrix estimating unit 602. Note that a dominance relationship graph will be described below.

The storing unit 70 includes the conditional utterance amount storing unit 701, the interrupt matrix storing unit 702, and the activity probability storing unit 703.

The conditional utterance amount storing unit 701 stores an amount of conditional utterances for each combination of members of a conference to be held.

The interrupt matrix storing unit 702 stores an interrupt matrix of members who can participate in the conference.

The activity probability storing unit 703 stores activity probability for each member who can participate in the conference.

The member selecting unit 80 estimates a member who will participate in a conference to be held on the basis of at least one of the amount of conditional utterances, the interrupt matrix, and the activity probability estimated by the estimating unit 60. Note that the total number of members who participate in a conference is input through an operation of the operation unit 2 by a user. Furthermore, the user inputs information (a name, an identification number, a department name, and the like) indicating members who necessarily participate in a conference by operating the operation unit 2.

The member selecting unit 80 receives the number of members who participate in a conference, a previously determined member who is determined to participate in advance, a list of members who are desired to participate in a conference, and the like output by the operation information acquiring unit 30. The member selecting unit 80 determines the total number N of members who will participate in a conference to be held, the number M of previously determined members and names of the members, and the number N-M of remaining members on the basis of the received information. The member selecting unit 80 outputs an estimation instruction to estimate at least one of an amount of conditional utterances, an interrupt matrix, and activity probability to the estimating unit 60. The member selecting unit 80 selects the other members who will participate in a conference to be held on the basis of the results estimated by the estimating unit 60. The member selecting unit 80 outputs information (a name, an identification number, a department name, and the like) indicating the selected members to the output apparatus 3 as selection results. Note that a method of selecting a member to participate in a conference to be held will be described in embodiments.

<Information Stored in Conference Data Storing Unit 40>

Next, an example of information stored in the conference data storing unit 40 will be described.

FIG. 2 is a diagram illustrating an example of information indicating members who can participate in a conference to be held stored in the conference data storing unit 40 according to the embodiment. As shown in FIG. 2, the conference data storing unit 40 stores information indicating members who can participate in a conference to be held. In the example illustrated in FIG. 2, information on an organization to which he or she belongs is associated with identification numbers and the associations are stored as information on members. Note that, although an example of an identification number is illustrated as an example of information indicating a member in the example illustrated in FIG. 2, an employee identification number, a name, and the like may be adopted instead of an identification number.

FIG. 3 is a diagram illustrating an example of an amount of utterances for each member stored in the conference data storing unit 40 according to this embodiment. Here, an amount of utterances is a value obtained by normalizing a total utterance time in one conference using a conference time at which a conference has been held. The example illustrated in FIG. 3 corresponds to an example of an amount of utterances in one conference to be held and the conference data storing unit 40 stores such information for each conference. Furthermore, the example illustrated in FIG. 3 corresponds to a case in which the number of all participants of a conference to be held is 5 and members with ID1, ID3, ID5, ID6, and ID9 participate. As shown in FIG. 3, the conference data storing unit 40 associates information indicating members with amounts of utterances $a_N$ (minutes/hour) and stores the associations. The conference data storing unit 40 associates, for example, ID1 with an amount of utterances $a_1$ (minutes/hour) and stores the association.

<Elements Used for Selecting Members Who Participate in Conference to be Held>

Next, elements used for selecting members who participate in a conference to be held used in an embodiment will be described and defined.

I. The total number of members who can participate in a conference to be held is set to N (here, N is an integer of 2 or more).

II. A member vector of a member who participates in a conference to be held is defined as g.

A member who participates in a conference is represented by a binary vector g with a length N, an $i^{th}$ component g (i) of g in a case in which it is included in an $i^{th}$ member is set to 1, and an $i^{th}$ component g (i) of g in other cases is set to 0 as in the following Expression (1). Note that R is a real number of 1 or more.

$$g(i) = \begin{cases} 1 & \text{case in which } ith \text{ component is included in member} \\ 0 & \text{other cases} \end{cases} \quad (1)$$

III. Member vector similarity is set to d ($\in$(0, 1)).

Proximity of members in a constitution is calculated from two member vectors. For example, member vector similarity d ($g_1$, $g_2$) between $g_1$ and $g_2$ is represented as in the following Expression (2).

$$d(g_1, g_2) = \frac{1}{1 + \sum_{i=1}^{N} |g_1(i) - g_2(i)|} \quad (2)$$

From Expression (2), member vector similarity in a case in which the number of different members satisfies 1/(1+2) =1/3.

IV. The total number of members who participate in a conference to be held is set to M.

Furthermore, M is defined as in the following Expression (3).

$$M = \sum_{i=0}^{N} g(i) \quad (3)$$

V. Values obtained by normalizing utterance times of members using time at which a conference has been performed is defined as amounts of utterances of the members as in the following Expression (4). For this reason, a unit of an amount of utterances is utterance time per hour. Note that a unit of a conference time is [time] and if a conference time is, for example, 150 minutes, a unit thereof is 2.5 [time].

$$\text{(Amount of utterances)} = \frac{\text{(Total time of utterance of } i \text{ in one conference)}}{\text{(one conference time)}} \quad (4)$$

VI. A value obtained by averaging amount of utterances of members with respect to all members who have participated in a conference is defined as an average amount of utterances $a_s \in R$ as in the following Expression (5)

$$a_s = \frac{1}{M_s} \sum_{i \in \text{member of conference}} \frac{\text{(Total utterance time of } i)}{\text{(Conference time of conference } s)} \quad (5)$$

Note that the conference data storing unit 40 stores information on S (S is an integer of 1 or more) conferences. In Expression (5), s is an integer between 1 and S.

VII. A member vector is set to $g_t$ in a conference t to be held.

<Amount of Conditional Utterances>

VIII. An amount of utterances $a^-_t$ of member vectors $g_t$ in a conference t to be held is defined as an amount of conditional utterances.

Estimation is performed from S pairs of member vectors gs of a previous conference and amounts of utterances as at that time. Since it is expected that an amount of utterances closer to an amount of conditional utterances $a^-_t$ is obtained when a constitution of a member who participates in a conference is closer to a target, an amount of conditional utterances $a^-_t$ is estimated using an average weighted with similarity between member vectors.

Here, a weight ws is defined as in the following Expression (6).

$$w_s = \frac{d(g_t, g_s)}{\sum_{i=1}^{S} d(g_t, g_i)} \quad (6)$$

Note that, since a weight ws is normalized, a relationship of the following Expression (7) is satisfied.

$$\sum_{i=1}^{S} w_s = 1 \quad (7)$$

The conditional utterance amount estimating unit 601 estimates an amount of conditional utterances $a^-_t$ by calculating the following Expression (8) using an amount of utterances weighted in this way.

$$\bar{a}_t \sum_{i=1}^{S} w_s a_s \quad (8)$$

<Interrupt Matrix>

IX. An amount of interrupts $O_{i(n), i(n+1)}$ (n is an integer of 1 or more) is defined as the number of interrupts from a member $i_{(n)}$ to a member $i_{(n+1)}$ per hour.

X. An interrupt matrix $O_s \in R^{M \times M}$ serving as a matrix representing an amount of interrupts of members in all (M) members is defined as an interrupt matrix $O_s(i_{(n)}, i_{(n+1)})$.

The interrupt matrix estimating unit 602 forms a matrix $O_s' \in R^{M \times M}$ in which a member vector $g_s$ for each previous conference is compared with a member vector $g_t$ of a conference to be held with respect to each pair of the member vector $g_s$ and an amount of interrupts $O_s$ at the time of conference, classification is performed as will be described below, and thus an interrupt matrix is estimated. Note that matrix sizes of $O_s$ differ in accordance with the total number of members who participate in a conference s.

(Classification 1) When members completely coincide with each other ($g_t = g_s$), an interrupt matrix $O_s$ is directly used as a matrix (hereinafter referred to as an "estimation matrix") used to estimate $O_s'$:

$$O_s' = O_s.$$

(Classification 2) When members do not coincide with each other ($g_t \neq g_s$), an estimation matrix $O_s' \in R^{M \times M}$ is constituted as in the following Expression (9).

$$O_s'(i_{(n)}, i_{(n+1)}) = \begin{cases} O_s(i_{(n)}, i_{(n+1)}) & \text{Both } i_{(n)} \text{ and } i_{(n+1)} \text{ are included in members of member vectors } g_s \\ & \text{(that is, } g_s(i_{(n)}) = 1 \text{ and } g_s(i_{(n+1)}) = 1) \\ \bar{o} & \text{Other cases} \end{cases} \quad (9)$$

Elements of the estimation matrix $O_s'$ correspond to members of member vectors $g_t$ in a conference t to be held instead of members of member vectors $g_s$ of a conference s. A value of a corresponding value $O_s(i_{(n)}, i_{(n+1)})$ of the original interrupt matrix is directly used for a pair of members belonging to both of the member vectors $g_t$ and the member vectors $g_s$.

On the other hand, since there is no corresponding value for members which do not belong to both thereof, instead, an average value $\bar{o}$ of a total amount of interrupts of all members in a previous conference is assigned.

Thus, the interrupt matrix estimating unit 602 calculates a weighted sum using similarity d with a member vector to obtain an interrupt matrix $\bar{O}_t$ of a target as in the following Expression (10) because S samples of the estimation matrix $O_s'$ can be generated.

$$\bar{O}_t = \sum_{s=1}^{S} w_s O_s' \quad (10)$$

Here, an example of an interrupt matrix will be described.

FIG. 4 is a diagram illustrating an example of an interrupt matrix according to the embodiment.

An image fg1 is a diagram for describing the number of interrupts and the number of intrusions in an interrupt matrix. The number of interrupts indicates the number of times a member interrupts another member. The number of intrusions indicates the number of times a member is interrupted by another member. As shown in the image fg1, a row direction represents the number of interrupts for each member and a column direction represents the number of intrusions for each member in the interrupt matrix.

Also, an image fg2 is a diagram for describing elements of an interrupt matrix. Since assignment cannot be performed on members themselves as shown in the image fg2, diagonal components are 0. Furthermore, as an example, an element 3 of a first row and a third column indicates that the number of interrupts from a first member to a third member is 3. An element 1 of an $n^{th}$ row and a first column indicates that the number of intrusions in which a first member is interrupted by an $n^{th}$ member is 3.

<Activity Probability>

X. Probability being transition (starting of an utterance of a member $i_{(n+1)}$ earlier than other members after an utterance of a member $i_{(n)}$ starts) of a turn from a member $i_{(n)}$ to a member $i_{(n+1)}$ is defined as activity probability (turn take probability) $q_{i(n), i(n+1)}$. Note that a sum ($\Sigma_{i \in \text{all members}} q_{i(n), (n+1)}$) of activity probability of all members who will participate in a conference to be held is normalized to be 1.

XI. From activity probability $q_{i(n), i(n+1)}$, a turn take matrix $Q_s \in R^{M \times M}$ representing activity probability of all members who will participate in a conference to be held is defined as $Q_s(i_{(n)}, i_{(n-1)}) = q_{i(n), i(n+1)}$.

The activity probability estimating unit 603 compares member vectors $g_s$ of a conference held in the past with member vectors $g_t$ of a conference to be held for S pairs of the member vectors $g_s$ and turn take matrixes $Q_s$ at the time of the conference to performs classification as will be described below and obtains an estimation matrix $Q_s' \in R^{M \times M}$ (s=1, ..., and S) used to estimate an interrupt matrix.

(Classification 1) When members completely coincide with each other ($g_t = g_s$), A turn take matrix $Q_s$ is directly used as an estimation matrix $Q_s'$:

$$Q_s' = Q_s.$$

(Classification 2) When members do not coincide with each other ($g_t = g_s$),

As in the following Expression (11), the estimation matrix $Q_s' \in R^{M \times M}$ is obtained.

$$O_s'(i_{(n)}, i_{(n+1)}) = \begin{cases} Q_s(i_{(n)}, i_{(n+1)}) & \text{Both } i_{(n)} \text{ and } i_{(n+1)} \text{ are included in members of member vectors} \\ & \text{(that is, } g_s(i_{(n)}) = 1 \text{ and } g_s(i_{(n+1)}) = 1) \\ \bar{q} & \text{Other cases} \end{cases} \quad (11)$$

Elements of the estimation matrix Qs' correspond to members of the member vectors $g_t$ of the conference t to be held instead of members of the member vectors $g_s$ of the conference s. A value of a corresponding value $Qs(i_{(n)}, i_{(n+1)})$ of the original turn take matrix is directly used for a pair of members belong to both of the member vectors $g_t$ and the member vectors $g_s$.

On the other hand, since there is no corresponding value for a member who does not belong to either thereof, instead, an average value $\bar{q}$ of a total amount of interrupts of all members in a previous conference is assigned.

Thus, the activity probability estimating unit 603 calculates a weighted sum using similarity d with a member vector to obtain a turn take matrix $Q^-_t{}'$ of a target as in the following Expression (12) because S samples of the estimation matrix Qs' can be generated.

$$\overline{Q'_t} = \sum_{s=1}^{S} w_s Q'_s \qquad (12)$$

Also, the activity probability estimating unit 603 performs normalization to calculate activity probability $Q^-_t$ as in the following Expression (13) as defined in the definition of probability.

$$\overline{Q_t}(i_{(n)}, i_{(n+1)}) = \frac{\overline{Q'_t}(i_{(n)}, i_{(n+1)})}{\sum_{i=0}^{N-1} \overline{Q'_t}(i_{(n)}, i_{(n+1)})} \qquad (13)$$

The conversation member optimization apparatus 1 estimates at least one of the amount of conditional utterances, the interrupt matrix, and the activity probability described above and selects members who participate in a conference to be held on the basis of the estimated results. Thus, the conversation member optimization apparatus 1 can select members appropriate for the conference to be held.

First Embodiment

An example in which a conversation member optimization apparatus 1 selects a member who participates in a conference to be held on the basis of estimated results of an amount of conditional utterances will be described in a first embodiment.

Note that a constitution of the conversation member optimization apparatus 1 may be a constitution shown in FIG. 1.

Figure 5:
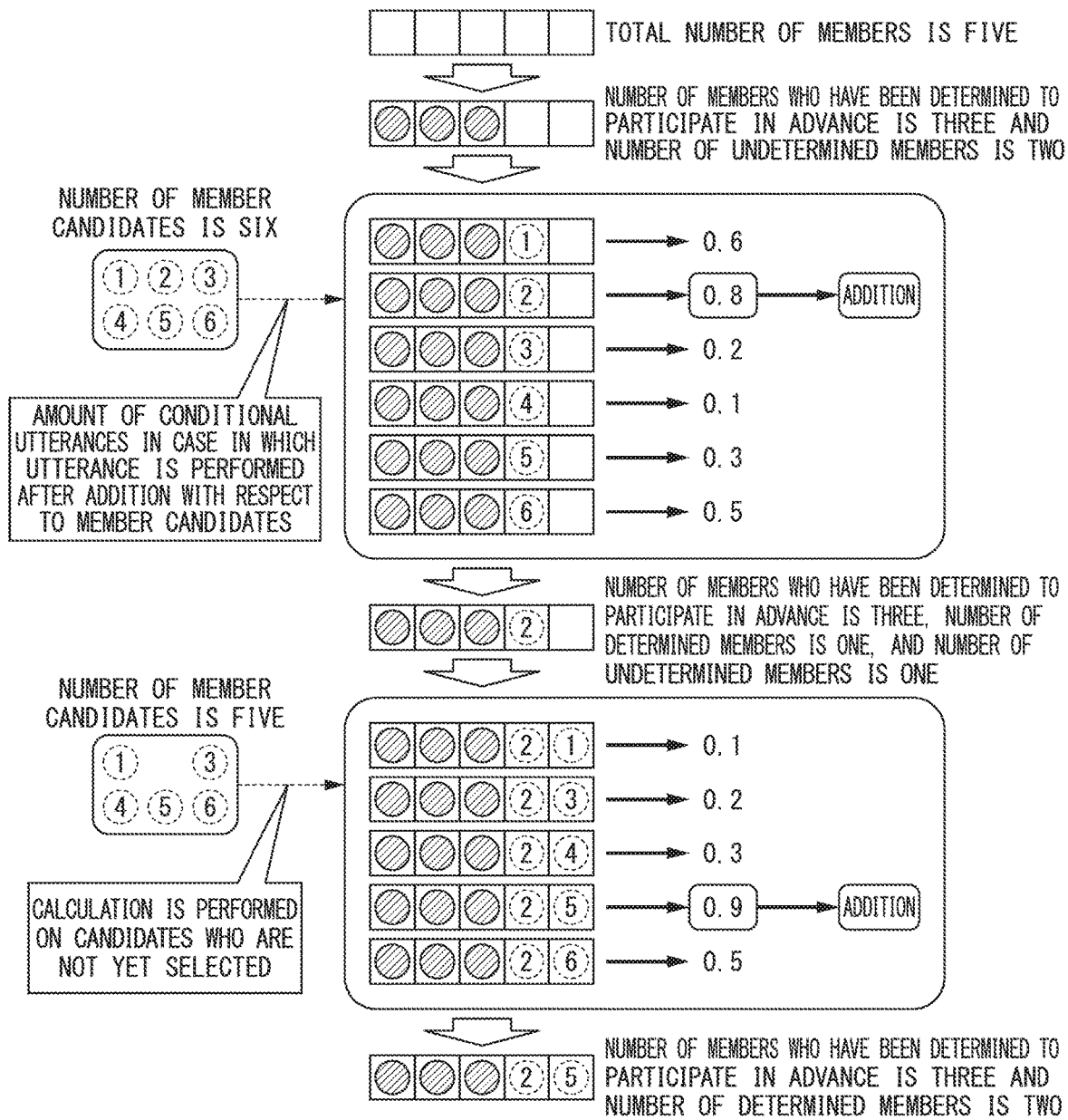
FIG. 5 is a diagram illustrating an example of a method of selecting a member to participate in a conference to be held according to a first embodiment.

FIG. 5 is a diagram illustrating an example of a method of selecting a member who participates in a conference to be held according to this embodiment. The example illustrated in FIG. 5 is an example in which the number of total participants of a conference to be held is five, the number of members who have been determined to participate in advance (who have been previously determined) is three, and the number of undetermined members is two. Note that a member who has been determined to participate in advance is, for example, a member or the like such as leaders or his or her assistant in the conference. Here, previously determined members are set to be member with ID7, ID8, and ID9. Furthermore, the other members who can participate in the conference to be held are set to be members with ID1 to ID6.

The member selecting unit 80 extracts information on a member who has been determined to participate from information output by the operation information acquiring unit 30. The member selecting unit 80 outputs an estimation instruction including information of a member who has been determined to participate (previously determined information), the total number of participants, and the number of undetermined members to the estimating unit 60.

The conditional utterance amount estimating unit 601 selects members other than the three previously determined participants (ID7, ID8, and ID9) one by one among the members stored by the conference data storing unit 40 and generates six types of member vectors g in the case of four members which includes a selected member (with one of ID1 to ID6) and the three previously determined members. Moreover, the conditional utterance amount estimating unit 601 calculates an amount of conditional utterances using the generated member vectors g and Expression (8).

In other words, the conditional utterance amount estimating unit 601 calculates amounts of conditional utterances in a case in which a member with one of ID1 to ID6 and members with ID7, ID8, and ID9 are provided. In the example illustrated in FIG. 5, amounts of conditional utterances are 0.6, 0.8, 0.2, 0.1, 0.3, and 0.5. For example, calculation is performed as follows. When there are participants A, B, and C, calculation is performed through ([an amount of utterances when there are B and C of A]+[an amount of utterances when there are A and C of B]+[an amount of utterances when there are A and B of C])/3.

Here, the method of calculating the amount of conditional utterances in FIG. 5 will be further described.

First, the conditional utterance amount estimating unit 601 extracts analysis results of a conference in which members with ID7, ID8, ID9, and ID1 participate from the conference data storing unit 40.

Subsequently, the conditional utterance amount estimating unit 601 reads the numbers of utterances of the members with ID7, ID8, ID9, and ID1 per hour for each conference from the conference data storing unit 40. When there are, for example, five conferences in which members with ID7, ID8, ID9, and ID1 have participated, amounts of conditional utterances when the members with ID1 to ID6 have participated are calculated using average amounts of utterances a, the member vectors g, and similarities d between the member vectors of members in the five conferences and Expression (8).

The member selecting unit 80 selects combinations of the members with ID7, ID8, ID9, and ID2 in a case in which an amount of conditional utterances estimated by the conditional utterance amount estimating unit 601 is at most 0.8.

Subsequently, the member selecting unit 80 outputs an estimation instruction used to estimate an amount of conditional utterances in a case in which another member other than the members with ID7, ID8, ID9, and ID2 is included as members to the conditional utterance amount estimating unit 601.

The conditional utterance amount estimating unit 601 selects members other than the three previously determined members (with ID7, ID8, and ID9) and the selected member with ID2 one by one from members stored in the conference data storing unit 40 and generates five types of member vectors when there are five members obtained by sequentially selecting four already determined members and another member (with ID1 and ID3 to ID6). Moreover, the conditional utterance amount estimating unit 601 calculates amounts of conditional utterances using the generated member vectors g.

In other words, the conditional utterance amount estimating unit 601 calculates amounts of conditional utterances when a member with one of ID1 and ID3 to ID6 and the members with ID7, ID8, ID9, and ID2 are provided. In the example illustrated in FIG. 5, amounts of conditional utterances are 0.1, 0.2, 0.3, 0.9, and 0.5.

The member selecting unit 80 selects combinations of members with ID7, ID8, ID9, ID2, and ID5 in a case in which an amount of conditional utterances estimated by the conditional utterance amount estimating unit 601 is at most 0.9.

Note that values of amounts of conditional utterances illustrated in FIG. 5 are values used for convenience of explanation.

As described above, the conversation member optimization apparatus 1 includes members who participate in a conference to be held one by one in the conference, acquires evaluation values when the members are included using an amount of conditional utterances serving as feature quantities, and selects a member with the highest evaluation value. Moreover, the conversation member optimization apparatus 1 includes a selected member in determined members, includes members who participate in a conference to be held one by one in the conference, acquires evaluation values when the members are included, and selects a member with the highest evaluation value. The conversation member optimization apparatus 1 selects members who actively utter in the conference to be held by repeatedly performing such a process.

As described above, in this embodiment, whether an amount of utterances has the highest value when members other than previously determined members among members who participate in a conference to be held on the basis of amounts of utterances in a conference held in the past have been set to any member combination is estimated by calculating amounts of conditional utterances. Thus, a member who has the most amount of utterances, that is, who is estimated to actively utter in the conference, can be selected.

Next, process steps of calculation of an amount of conditional utterances will be described using a flowchart.

Figure 6:
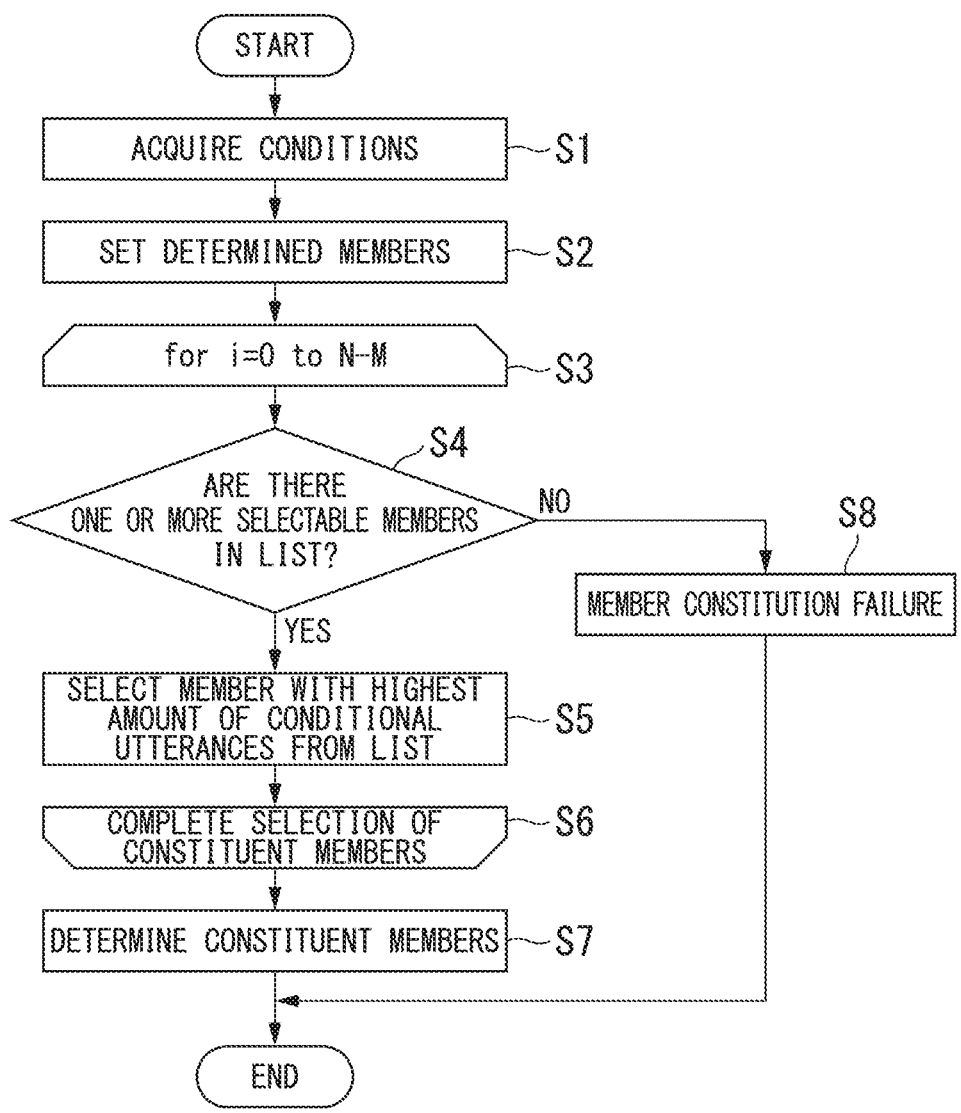
FIG. 6 is a flowchart for describing a process of selecting a member to participate in the conference to be held according to the first embodiment.

FIG. 6 is a flowchart for describing a process of selecting a member who participates in the conference to be held according to this embodiment.

(Step S1) The member selecting unit 80 acquires conditions of a conference to be held from operation information output by the operation information acquiring unit 30. Here, the conditions acquired by the member selecting unit 80 include the total number of members M who participate in the conference to be held and information indicating members who have been determined to participate in advance (an identifier, a name, and the like).

(Step S2) The member selecting unit 80 sets determined members from the information indicating the members who have been determined to participate in advance acquired from the operation information output by the operation information acquiring unit 30. Subsequently, the member selecting unit 80 generates an estimation instruction on the basis of the acquired information and the set information and outputs the generated estimation instruction to the conditional utterance amount estimating unit 601.

(Step S3) The estimating unit 60 and the member selecting unit 80 repeatedly perform Step S4 and Step S5 until members of the conference to be held are selected or selection fails.

(Step S4) The estimating unit 60 determines whether one member or more other than the determined members can be selected from a list of members stored in the conference data storing unit 40. The estimating unit 60 proceeds to Step S5 when it is determined that one selectable member or more is included in the list (Step S4; YES) and proceeds to Step S8 when it is not determined that one selectable member or more is included in the list (Step S4: NO).

(Step S5) The conditional utterance amount estimating unit 601 generates member vectors when the estimating unit 60 includes members sequentially selected by the estimating unit 60 one by one in the determined members. Subsequently, the conditional utterance amount estimating unit 601 calculates amounts of conditional utterances using the generated member vectors. Subsequently, the member selecting unit 80 determines selected a member with the highest value as constituent members (members who participate in the conference) from the amounts of conditional utterances calculated by the conditional utterance amount estimating unit 601. For example, when the total number of participating members is five and the number of determined members is three, the conditional utterance amount estimating unit 601 selects a first member in a first round and selects a second member in a second round.

(Step S6) The estimating unit 60 and the member selecting unit 80 proceed to Step S7 after the process of Step S4 and Step S5.

(Step S7) The member selecting unit 80 determines the selected members as the members who will participate in a conference to be held. Subsequently, the member selecting unit 80 outputs information indicating determined members (including the determined members) (for example, a name and identification information) to the output apparatus 3. Note that the member selecting unit 80 may retrieve department names to which the determined members belong and the like from the conference data storing unit 40 when the conference data storing unit 40 stores organizations to which they belong of the members and the like and output the retrieved results to the output apparatus 3.

(Step S8) The member selecting unit 80 outputs information indicating that a member could not be selected to the output apparatus 3.

Note that the above-described method of calculating the amount of conditional utterances is merely an example and the present invention is not limited thereto. The amount of conditional utterances may be the number of utterances in one conference. In this case, the amount of utterances for each member shown in Expression (4) may be (the number of utterances in one conference)/(one conference time). Furthermore, the average amount of utterances shown in Expression (5) may be $1/M \times [\Sigma_{I \in conference\ member}\{(\text{the number of utterances of i})/(\text{conference time of a conference s})\}]$.

Also, the member selecting unit 80 may output information indicating members in a combination of members serving as the most preferred result among the selected members as well as, for example, information indicating members in second and third combinations to the output apparatus 3.

Thus, the user can select an alternative member even when there is a member who cannot participate due to urgent business or the like in members who participate in the conference to be held. In this way, the conversation member optimization apparatus 1 can provide a first candidate in the members who participate in the conference as well as a second candidate, a third candidate, . . . .

As described above, the conversation member optimization apparatus 1 in this embodiment estimates amounts of conditional utterances in a case in which members in a conference to be held are combined with determined members who are determined to participate and selectable members from results of analyzing conversations in a conference held in the past.

Also, the conversation member optimization apparatus 1 in this embodiment selects one member with the highest amount of conditional utterances among the estimated results as a member, repeatedly performs the selection process with respect to the total number of members who have participated, and selects a participating member in the conference to be held.

Thus, according to this embodiment, since a participating member is selected regarding an amount of utterances to be the most important, a member estimated to actively utter in a conference to be held can be selected.

According to this embodiment, since several (one or more) members are determined in advance from members who participate in a conference to be held and other members are sequentially selected one by one, an amount of calculation can be reduced.

Since discussions corresponds to a plurality of people' communications, there are combinations in which discussions are actively performed and combinations in which discussions are not actively performed. This is affected by prior knowledge as well as an ability to discuss. Particularly, although optimization of conference members based on an ability to discuss is an important element with respect to the output quality of a discussion, since it is difficult to quantitatively evaluate an ability to discuss, the conference members were selected by hosts using only meta information such as experiences, senses, or ages in the related art.

On the other hand, according to this embodiment, appropriate members can be selected by analyzing conversations in a conference held in the past and calculating an appropriate combination of discussions from the role estimation result of participants and an utterance behavior in the past. Thus, according to this embodiment, utterances are actively performed in a conference, that is, quality of the conference can be improved.

Note that, although a case in which members who can participate in a conference are determined one by one in this embodiment has been described, the present invention is not limited thereto. The conversation member optimization apparatus 1 may estimate amounts of conditional utterances, for example, by combining all combinations with determined members with respect to the other two members. For example, when the number of candidates for the two other members is six, the conversation member optimization apparatus 1 may estimate amounts of conditional utterances of 30 types (=6×5) of combinations. Moreover, the conversation member optimization apparatus 1 may select members having a combination with the highest amount of conditional utterances among the estimated amounts of conditional utterances.

Although an example in which determined members have been determined in advance has been described in this embodiment, the present invention is not limited thereto. When no one member is determined in a conference to be held in advance, the conversation member optimization apparatus 1 may temporarily select one member from candidate members who can participate in a conference, sequentially select other members, and select members of a combination with the highest amount of conditional utterances. The conversation member optimization apparatus 1 may adopt a combination with the highest amount of conditional utterances among combinations of two members and select members of a combination with the highest amount of conditional utterances with respect to a third member, a fourth member, . . . as described in the embodiment.

Second Embodiment

In a second embodiment, an example in which participating members are selected using a weight according to an instruction from the user with respect to an amount of utterances, interrupt, and activity (a turn take) serving as feature quantities on the basis of the three feature quantities.

Note that a constitution of a conversation member optimization apparatus 1 corresponds to the constitution shown in FIG. 1.

<Dominance Relationship Graph>

Figure 7:
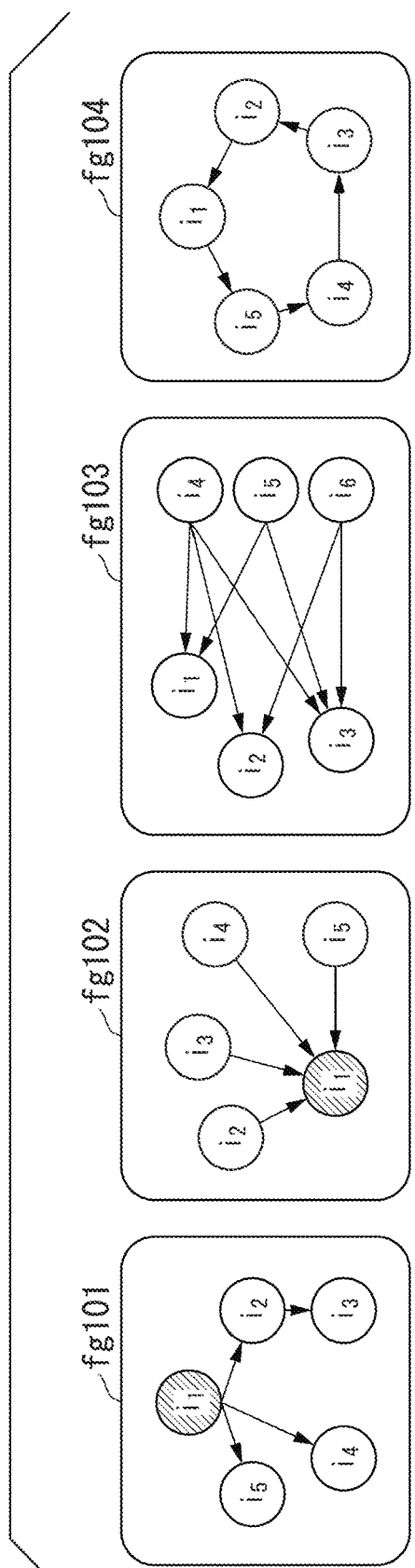
FIG. 7 is a diagram illustrating examples of dominance relationship graphs according to a second embodiment.

First, dominance relationship graphs used in this embodiment will be described. FIG. 7 is a diagram illustrating examples of dominance relationship graphs according to this embodiment. Note that, in FIG. 7, $i_1$ to $i_6$ indicate members who participate in a conference. Furthermore, an image fg101 to an image fg104 are examples of dominance relationship graphs.

The dominance relationship graph represented as the image fg101 has a tree structure and has a structure in which one member $i_1$ dominates other members $i_2$ to $i_5$. In this embodiment, such a dominance relationship is referred to as a one dominator type.

The dominance relationship graph represented as the image fg102 has an inverted tree structure and has a structure in which other members $i_2$ to $i_5$ dominate one member $i_1$. In this embodiment, such a dominance relationship is referred to as a one-member-dominated type.

The dominance relationship graph represented as the image fg103 has a two part graph structure and has a structure in which a member $i_4$ and a member $i_5$ dominate a member $i_1$, the member $i_4$ and a member $i_6$ dominate a member $i_2$, and the member $i_4$, the member $i_5$, and the member $i_6$ dominate a member $i_3$. In this embodiment, such a dominance relationship is referred to as a dominator—dominated member type.

The dominance relationship graph represented as the image fg104 has a closed loop structure and has a structure in which a member $i_2$ dominates a member $i_1$, a member $i_3$ dominates the member $i_2$, a member $i_4$ dominates the member $i_3$, a member $i_5$ dominates a member $i_4$, and the member $i_1$ dominates the member $i_5$. In this embodiment, such a dominance relationship is referred to as a dominator-absence type.

Note that the graphs of dominance relationships shown in FIG. 7 are merely examples and may be of other dominance relationships in which the total numbers of members, dominance relationships, and structures differ. A conference data storing unit 40 stores information indicating relationship of such dominance relationship graphs in advance.

<Method of Generating Dominance Relationship Graph>

In this embodiment, a dominance relationship graph estimating unit 604 estimates dominance relationship graphs on the basis of the number of interrupts of utterances in a conference which has been held.

Figure 8:
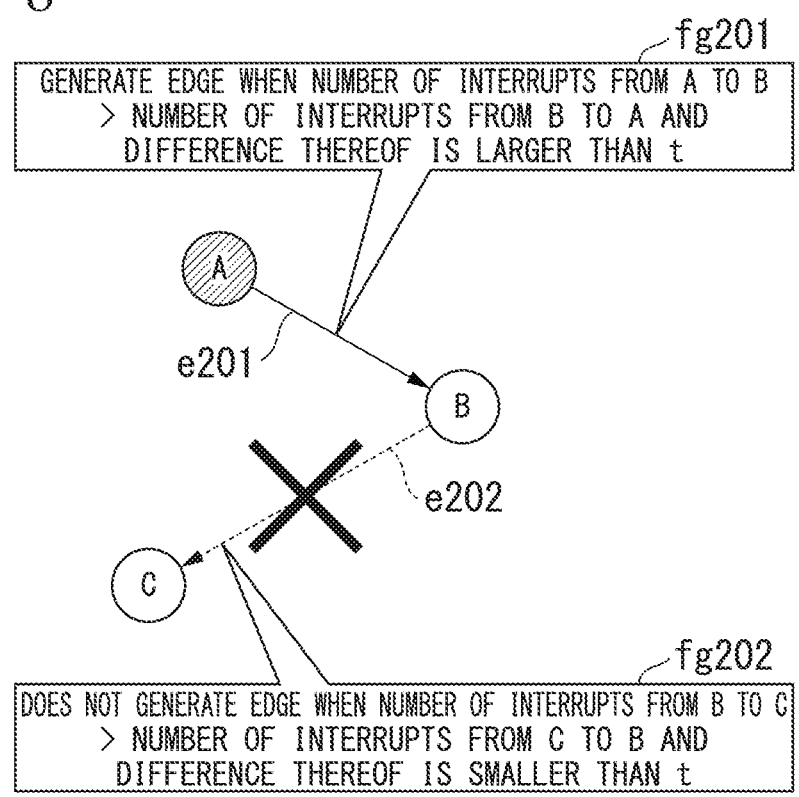
FIG. 8 is a diagram illustrating an example of generation of a dominance relationship graph according to the second embodiment.

FIG. 8 is a diagram illustrating an example of generation of a dominance relationship graph according to this embodiment. In FIG. 8, reference numerals A to C are members and nodes in a graph. Furthermore, edges e201 to e202 are edges in the graph.

In an example illustrated in FIG. 8, as represented as a symbol fg201, the dominance relationship graph estimating unit 604 generates the edge e201 when the number of interrupts from the member A to the member B is more than the number of interrupts from the member B to the member A and a difference thereof is larger than a predetermined value t.

Also, as represented as a symbol fg202, the dominance relationship graph estimating unit 604 does not generate the edge e202 when the number of interrupts from the member B to the member C is more than the number of interrupts from the member C to the member B and a difference thereof is smaller than a predetermined value t.

The dominance relationship graph estimating unit 604 estimates a dominance relationship graph using selected members on the basis of the number of interrupts for each member estimated by the interrupt matrix estimating unit 602.

When the user designates a dominance relationship graph, the dominance relationship graph estimating unit 604 determines whether the dominance relationship graph is similar to a designated structure. For example, when the user instructs a one dominator type, the dominance relationship graph estimating unit 604 estimates a dominance relationship graph using selected members, determines the dominance relationship graph to be a one dominator type if the dominance relationship graph is similar to a one dominator type, and determines the dominance relationship graph not to be a one dominator type in other cases.

In this way, in this embodiment, the user (for example, hosts and leaders in a conference) can designate dominance relationships obtained in a conference to be held and select members who are close to the dominance relationship and actively utter.

Subsequently, an example of steps for identifying the type of a dominance relationship graph performed by the dominance relationship graph estimating unit 604 will be described.

Figure 9:
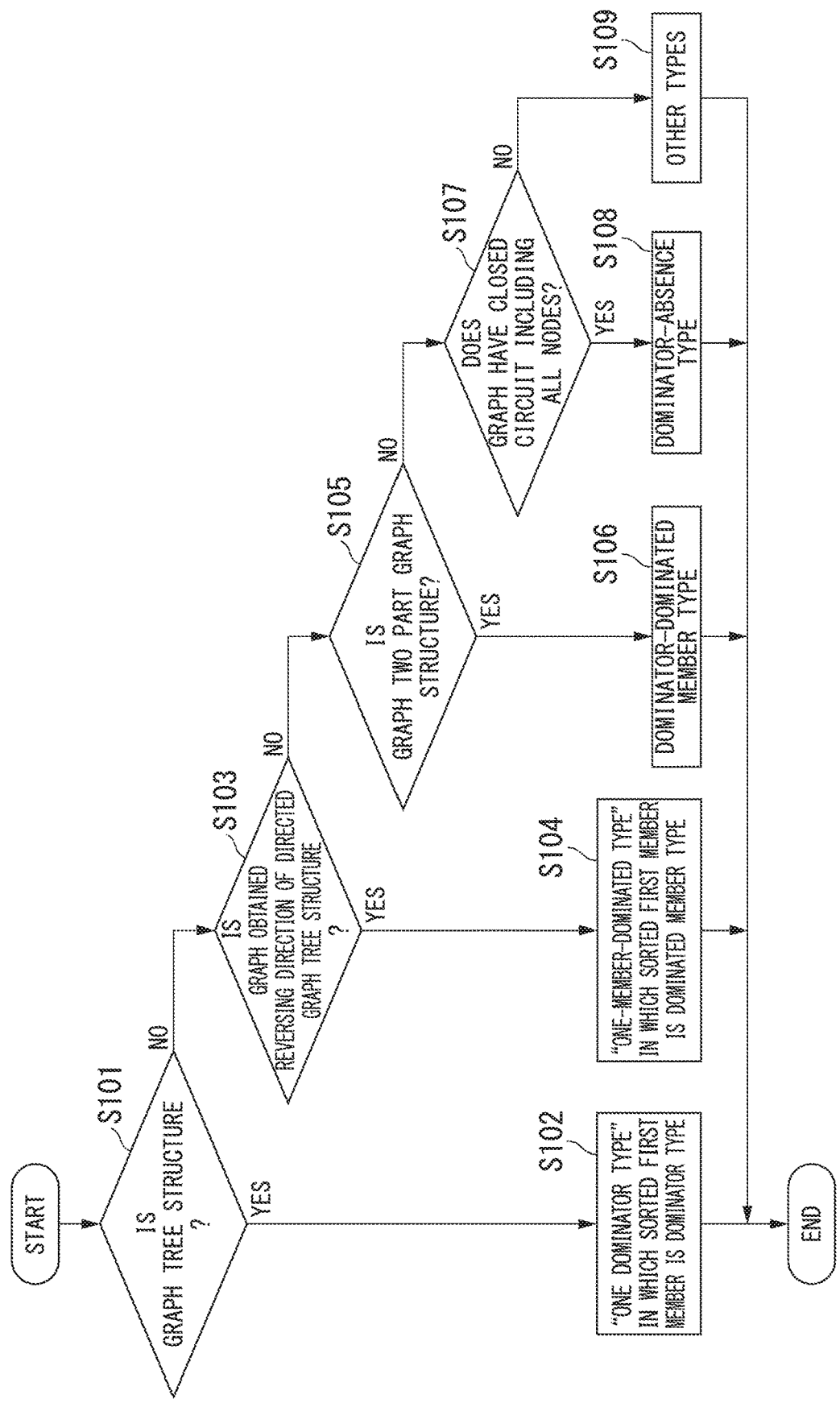
FIG. 9 is a flowchart for describing steps of identifying a type of a dominance relationship graph according to the second embodiment.

FIG. 9 is a flowchart for describing steps for identifying the type of a dominance relationship graph according to this embodiment.

(Step S101) The dominance relationship graph estimating unit 604 determines whether an estimated graph has a tree structure. The dominance relationship graph estimating unit 604 proceeds to Step S102 when it is determined that the estimated graph has the tree structure (Step S101; YES) and proceeds to Step S103 when it is determined that the estimated graph is not the tree structure (Step S101; NO).

(Step S102) The dominance relationship graph estimating unit 604 sorts sums of the number of interrupts to other members for each member in a descending order thereof. Subsequently, the dominance relationship graph estimating unit 604 identifies the estimated graph as a "one dominator type" in which the sorted first member is a dominator. The dominance relationship graph estimating unit 604 ends a process after the identifying.

(Step S103) The dominance relationship graph estimating unit 604 determines whether a graph obtained by reversing a direction of a directed graph has a tree structure. The dominance relationship graph estimating unit 604 proceeds to Step S104 when it is determined that the graph obtained by reversing the direction of the directed graph has the tree structure (Step S103; YES) and proceeds to Step S105 when it is determined that the graph obtained by reversing the direction of the directed graph have no tree structure (Step S103; NO).

(Step S104) The dominance relationship graph estimating unit 604 sorts sums of the number of interrupts to other members for each member in a descending order thereof. Subsequently, the dominance relationship graph estimating unit 604 identifies the estimated graph as a "one-member-dominated type" in which the sorted first member is a dominated member. The dominance relationship graph estimating unit 604 ends a process after the identifying.

(Step S105) The dominance relationship graph estimating unit 604 determines whether the estimated graph has a two part graph structure. The dominance relationship graph estimating unit 604 proceeds to Step S106 when it is determined that the estimated graph has the two part graph structure (Step S105; YES) and proceeds to Step S107 when it is determined that the estimated graph have no two part graph structure (Step S105; NO).

(Step S106) The dominance relationship graph estimating unit 604 identifies the estimated graph as a "dominator-dominated member type." The dominance relationship graph estimating unit 604 ends a process after the identifying.

(Step S107) The dominance relationship graph estimating unit 604 determines whether the estimated graph has a structure (a closed loop structure) having a closed circuit including all nodes. The dominance relationship graph estimating unit 604 proceeds to Step S108 when it is determined that the estimated graph has the structure having the closed circuit including all nodes (Step S107; YES) and proceeds to Step S109 when it is determined that the estimated graph have no structure having the closed circuit including all nodes (Step S107; NO).

(Step S108) The dominance relationship graph estimating unit 604 identifies the estimated graph as a "dominator-absence type." The dominance relationship graph estimating unit 604 ends a process after the identifying.

(Step S109) The dominance relationship graph estimating unit 604 identifies the estimated graph as "other types." The dominance relationship graph estimating unit 604 ends a process after the identifying.

<Method of Combining Using Weight Sum>

Next, an example of a method of selecting a member of a conference to be held in this embodiment will be described.

The user operates an operation unit 2 to input any of three feature quantities (an amount of utterances, interrupt, and a turn take) regarded to be the most important, for example, at a ratio.

The user operates the operation unit 2 to input the total number of members who will participate in a conference to be held and determined members as in the first embodiment.

The user operates the operation unit 2 to input information indicating a dominance relationship graph to be designated when desiring to designate the dominance relationship graph.

The user operates the operation unit 2 to input information indicating exclusion members (names, identification numbers, employee identification numbers, and the like) if there are members (the exclusion members) who he or she does not desire to participate in a conference to be held.

The operation unit 2 outputs the input operation information to the operation information acquiring unit 30. The operation information acquiring unit 30 outputs the acquired operation information to a member selecting unit 80.

Subsequently, the member selecting unit 80 designates and sets the following parameters in association with a weight, an amount of utterances, interrupt, a turn take, and a dominance relationship graph.

I. The member selecting unit 80 sets a ratio of weights ($w_a$, $w_o$, and $w_{qo}$) depending on elements regarded to be the most important.

Here, the weight wa is a weight for an amount of utterances, the weight $w_o$ is a weight for an interrupt, and the weight $w_{qo}$ is a weight for a turn take.

II. The member selecting unit 80 sets a function $f_0$ (O) of converting an interrupt matrix O into a scalar value in accordance with an instruction of the user, for example, like the following Example 1 to Example 3.

Example 1

When interrupts need to be minimized;

$$f_0(O) = -\sum_{i_1=1}^{M}\sum_{i_2=1}^{M} O(i_{(n)}, i_{(n+1)}) \quad (14)$$

Example 2

When a ratio at which $i_{(n)}$ is interrupted needs to be reduced;

$$f_0(O) = \sum_{i_2=1}^{M} O(i_{(n)}, i_{(n+1)}) \quad (15)$$

Example 3

When a dominance relationship graph has been designated;

$$f_0(O) = \begin{cases} 1 & \text{when a dominance relationship graph of } O \text{ is similar or equal to a designated structure} \\ 0 & \text{other cases} \end{cases} \quad (16)$$

III. The member selecting unit 80 sets a function $f_q$ (Q) of converting a turn take matrix Q into a scalar value, for example, like the following Example 1.

Example 1

When overall activity probability needs to be uniform;

$$f_q(O) = -\sum_{i_1=1}^{S}\sum_{i_2=1}^{S} (Q(i_{(n)}, i_{(n+1)}) - \bar{q})^2 \quad (17)$$

Here, in Expression (17), $q^-$ is an average of all elements of Q.

Figure 10:
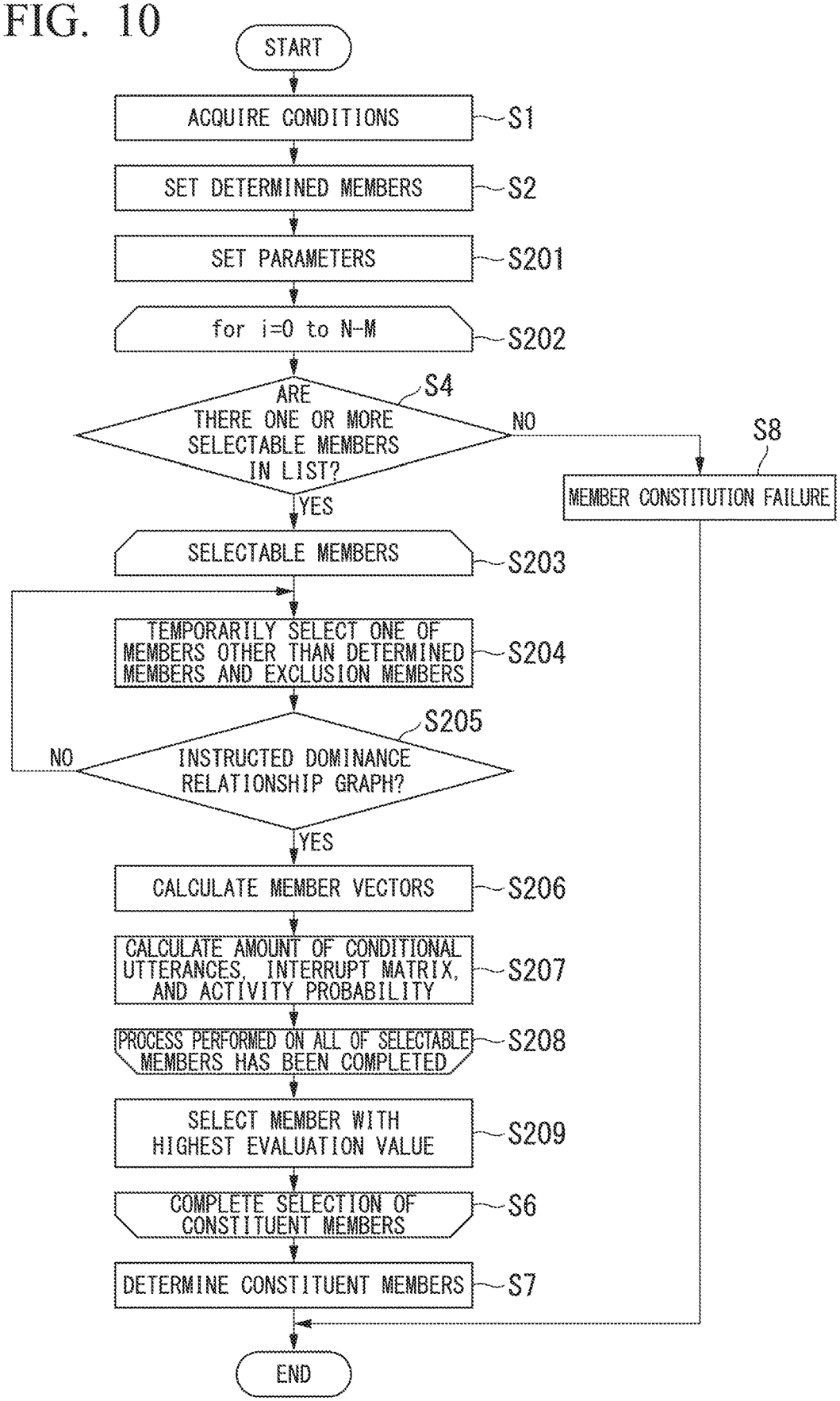
FIG. 10 is a flowchart for describing a process of selecting a member to participate in a conference to be held according to the second embodiment.

FIG. 10 is a flowchart for describing a process of selecting a member who participates in a conference to be held according to this embodiment. Note that processes which are the same as that of the first embodiment will be described using the same reference numerals and the descriptions thereof are omitted.

The member selecting unit 80 selects the members other than determined members among members who participate in a conference to be held through the following steps. Note that it is assumed that there is at least one determined member in the following process.

(Steps S1 and S2) The member selecting unit 80 performs Steps S1 and S2. The member selecting unit 80 proceeds to Step S201 after the process has been completed.

(Step S201) The member selecting unit 80 sets above-described parameters (the weights, a function $f_O$ (O) of converting an interrupt matrix O into the scalar value, and a function $f_q$ (Q) of converting a turn take matrix Q into the scalar value).

(Step S202) An estimating unit 60 and the member selecting unit 80 repeatedly perform Step S4 to Step S209 until members of the conference to be held are selected or selection fails.

(Step S4) The estimating unit 60 determines whether one or more members other than the determined members can be selected from a list of members stored in the conference data storing unit 40. The estimating unit 60 proceeds to Step S203 when it is determined that there are one or more selectable members in the list (Step S4; YES) and proceeds to Step S8 when it is determined that there are no one or more selectable members in the list (Step S4; NO).

(Step S203) The dominance relationship graph estimating unit 604 and the member selecting unit 80 repeatedly perform Step S204 to S207 on all of the selectable members (other than the determined members and the exclusion members).

(Step S204) The dominance relationship graph estimating unit 604 temporarily selects one of the members other than the determined members and the exclusion members.

(Step S205) The dominance relationship graph estimating unit 604 generates a graph when the determined members and the temporarily selected member are included as the members on the basis of the number of interrupts between the members estimated by the interrupt matrix estimating unit 602 and identifies what type of constitution is the generated graph, for example, using the process in FIG. 9. Subsequently, the dominance relationship graph estimating unit 604 determines whether the identified type is the same as or close to the instructed type of the dominance relationship graph. The dominance relationship graph estimating unit 604 sets the function $f_O$ (O) of converting the interrupt matrix O into the scalar value to 1 when it is determined that the identified type is the same as or close to the instructed type of the dominance relationship graph (Step S205; YES) and a process thereof proceeds to Step S206. Alternatively, the dominance relationship graph estimating unit 604 sets the function $f_O$ (O) of converting the interrupt matrix O into the scalar value to 0 when it is determined that the identified type is not the same as or close to the instructed type of the dominance relationship graph (Step S205; NO) and a process thereof returns to the process of Step S204.

(Step S206) The member selecting unit 80 calculates member vectors $g_t^{(1)}(i)$ (i is an integer between 1 and N) in which the determined members and the temporarily selected member are included as the members when the dominance relationship graph is the same as or close to a structure instructed by the user.

(Step S207) The member selecting unit 80 calculates an amount of conditional utterances $a^-_t$, an interrupt matrix $O^-_t$, and activity probability $Q^-_t$ from the calculated member vectors $g_t^{(1)}(i)$.

(Step S208) The dominance relationship graph estimating unit 604 and the member selecting unit 80 proceed to Step S209 after the process of Step S204 to S207 performed on all of the selectable members (other than the determined members and the exclusion member) has been completed.

(Step S209) The member selecting unit 80 calculates evaluation values eval (i) of combinations of members satisfying conditions using Step S4 to S207 as in the following Expression (18). Subsequently, the member selecting unit 80 selects a member with the highest value among the calculated evaluation values. The member selecting unit 80 proceeds to Step S6 after the process.

$$\text{Evaluation value eval}(i) = w_a \bar{a}_t + w_o f_o(\overline{O}_t) + w_q f_q(\overline{Q}_t) \quad (18)$$

(Step S6) The estimating unit 60 and the member selecting unit 80 proceed to Step S7 after Step S4 to Step S208 has been completed.

(Steps S7 and S8) The member selecting unit 80 performs Step S7 and S8.

Note that, although an example in which a dominance relationship graph is designated has been described in the above-described example, when a dominance relationship graph is not designated, the dominance relationship graph estimating unit 604 does not perform the process of Step S205 and a process thereof proceeds to the process of Step S206 after the process of Step S204.

Also, although an example in which three elements such as an amount of utterances, an interrupt, and a turn take are used has been described in the above-described example, at least one may be used in response to an instruction of the user. For example, when only an interrupt to be the most important is regarded and other feature quantities (an amount of utterances and a turn take) are not used, an evaluation value is calculated by setting weights $w_a$ and $w_{qo}$ to 0 and setting a weight $w_a$ to 1.

For example, an example in which members are selected using only an amount of conditional utterances will be described using FIG. 11.

Figure 11:
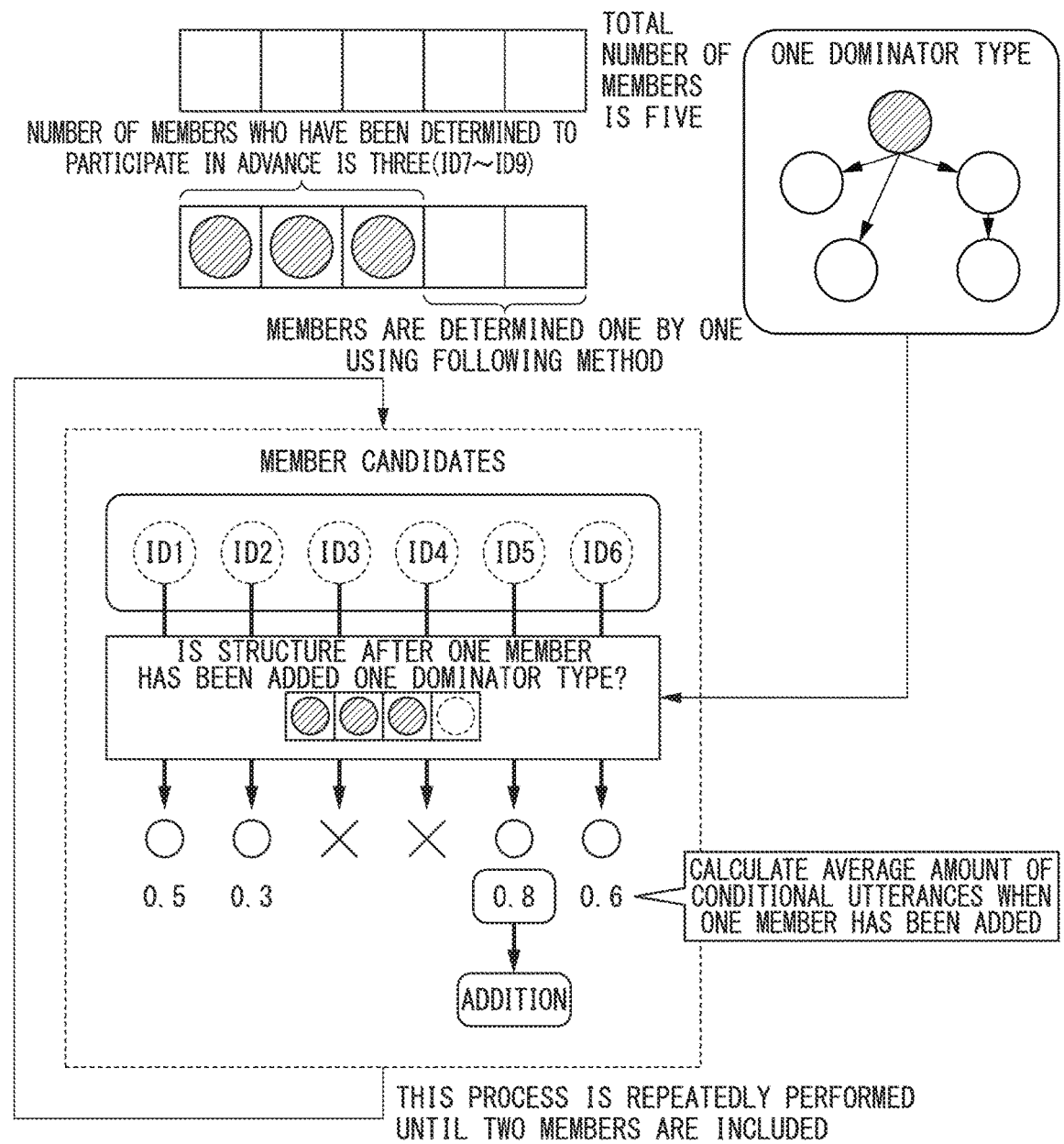
FIG. 11 is a diagram illustrating an example in which a member is selected using only an amount of conditional utterances according to the second embodiment.

FIG. 11 is a diagram illustrating an example in which a member is selected using only an amount of conditional utterances according to this embodiment.

The example illustrated in FIG. 11 is an example in which the total number of members who participate in a conference to be held is five, the number of determined members is three members (with ID7 to ID9), and a dominance relationship graph instructed by the user is a one dominator type. Furthermore, it is assumed that identification numbers of six selectable members are ID1 to ID6.

The dominance relationship graph estimating unit 604 estimates a dominance relationship graph when three determined members and one of the selectable members are temporarily included as the members and determines whether a structure of the estimated graph is the one dominator type. The example illustrated in FIG. 11 includes the fact that the structure thereof is not the one dominator type based on the determination result when a member with ID3 or ID4 is included as a member.

Subsequently, the conditional utterance amount estimating unit 601 generates member vectors in which members with ID1, ID2, ID5, and ID6 included as the members one by one and members with ID7 to ID9 are included and calculates amounts of conditional utterances using the generated member vectors. Considering the calculated results, amounts of conditional utterances are 0.5, 0.3, 0.8, and 0.6 in the cases of a combination of members with (ID7, ID8, ID9, and ID1), a combination of members with (ID7, ID8, ID9, ID2), a combination of members with (ID7, ID8, ID9, and ID5), and a combination of members with (ID7, ID8, ID9, and ID6), respectively. Thus, the member selecting unit 80 selects the member with ID of the combination with the highest amount of conditional utterances as a first member.

The estimating unit 60 and the member selecting unit 80 repeatedly perform such a process until two members (=5−3) are included as the members.

As described above, the conversation member optimization apparatus 1 in this embodiment causes the amount of utterances, the interrupt, and the turn take to be weighted and sets their weights in accordance with the user's request.

Thus, according to this embodiment, since a member who an amount of utterances can be increased in a conference, an amount of interrupts can be increased in a conference, and a turn take can be increased in a conference can be selected, a member appropriate for a conference can be selected.

Also, according to this embodiment, since a member can be selected using any of an amount of utterances, an interrupt, and a turn take to be regarded to be the most important which is weighted in accordance with the user's instruction and thus the best member for a conference can be selected.

According to this embodiment, since a member can be selected using at least one of an amount of utterances, an interrupt, and a turn take to be regarded to be the most important in accordance with the user's instruction, a member appropriate for a conference can be selected.

Note that a conversation is actively exchanged by selecting a member who a turn take can be increased.

Third Embodiment

In a third embodiment, an example in which participating members are selected without using weights of an amount of utterances, an interrupt, and activity (a turn take) serving as feature quantities according to the user's instruction on the basis of such three feature quantities will be described.

Note that a constitution of a conversation member optimization apparatus 1 is the constitution shown in FIG. 1.

When a weight is not used, an estimating unit 60 and a member selecting unit 80 include selectable members temporarily included one by one and determined members as the members and calculate sequentially amounts of conditional utterances, interrupt matrixes, and activity probabilities at all such times. Note that a sequentially calculated item may be an item according to the user's instruction (an item to be regarded to be the most important) and the like.

The estimating unit 60 and the member selecting unit 80 selects members who calculated values are larger than predetermined threshold values. Note that, when selection results of amounts of conditional utterances, interrupt matrixes, and activity probabilities differ, members who differences between threshold values and calculated values are the highest may be selected. Alternatively, when selection results of amounts of conditional utterances, interrupt matrixes, and activity probabilities differ, three candidate members may be selected in a first round.

The estimating unit 60 and the member selecting unit 80 include members selected in the first round and determined members as the members in a second round. Subsequently, the estimating unit 60 and the member selecting unit 80 temporarily include selectable members one by one from other selectable members including the members selected in the first round and the determined members and sequentially calculate amounts of conditional utterances, interrupt matrixes, and activity probabilities at all such times. Note that, when a plurality of candidate members are selected in a first round, the estimating unit 60 and the member selecting unit 80 include a plurality of candidate members one by one and determined members as the members, temporarily include selectable members one by one, and sequentially calculate amounts of conditional utterances, interrupt matrixes, and activity probabilities at all such times. For example, when determined members are members with ID7, ID8, and ID9 and candidate members in a first round are members with ID1 and ID3, the members with (ID1, ID7, ID8, and ID9) and selectable members are included as the members and values are calculated and the members with (ID3, ID7, ID8, and ID9) and selectable members are included as the members and values are further calculated.

The estimating unit 60 and the member selecting unit 80 select a member whose the calculated values are larger than a predetermined threshold value as in the first round.

Figure 12:
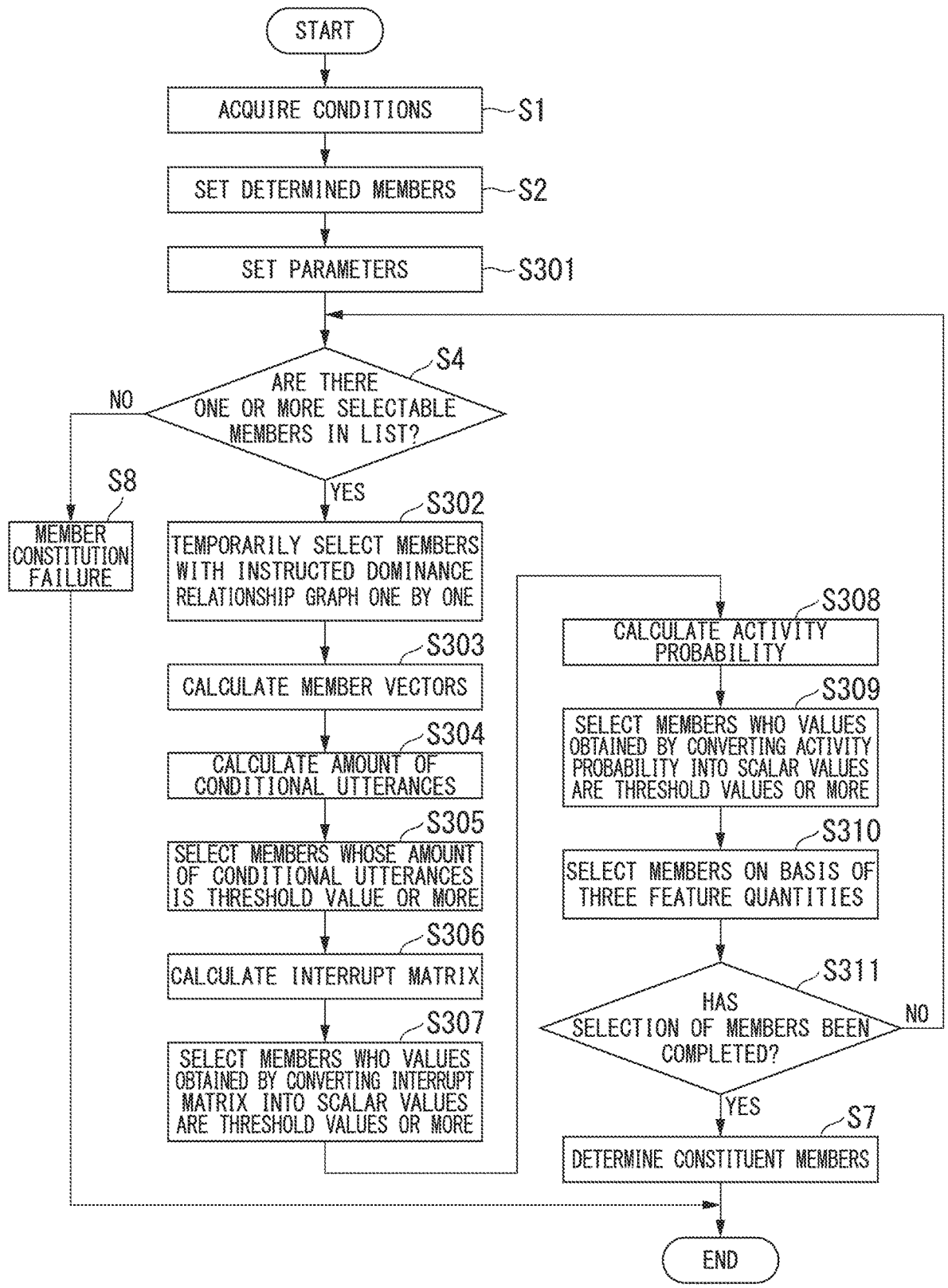
FIG. 12 is a flowchart for describing a process of selecting a member who participates in a conference to be held according to a third embodiment.

FIG. 12 is a flowchart for describing a process of selecting a member who participates in a conference to be held according to this embodiment. Note that processes which are the same as those of FIGS. 6 and 10 will be described using the same reference numerals and the descriptions thereof will be omitted.

(Steps S1 and S2) A member selecting unit 80 performs Steps S1 and S2. The member selecting unit 80 proceeds to Step S301 after the process has been completed.

(Step S301) The member selecting unit 80 sets parameters (a function $f_O(O)$ of converting an interrupt matrix O into a scalar value and a function $f_q(Q)$ of converting a turn take matrix Q into a scalar value).

Hereinafter, an estimating unit 60 and the member selecting unit 80 repeatedly perform Step S4 to Step S311 until members in a conference to be held are selected or selection fails and select members.

(Step S4) The estimating unit 60 determines whether one or more members other than the determined members can be selected from a list of members stored in the conference data storing unit 40. The estimating unit 60 proceeds to Step S302 when it is determined that there are one or more selectable members in the list (Step S4; YES) and proceeds to Step S8 when it is determined that there are no one or more selectable members in the list (Step S4; NO).

(Step S302) A dominance relationship graph estimating unit 604 temporarily selects one member other than the determined members and the exclusion member. Note that the dominance relationship graph estimating unit 604 excludes members whose flags set to 1 and selects members. Subsequently, the dominance relationship graph estimating unit 604 generates a graph when a temporarily selected member and determined members are included as the members on the basis of the number of interrupts between members estimated by an interrupt matrix estimating unit 602 and identifies what type of constitution is the generated graph, for example, through the process in FIG. 9. Subsequently, the dominance relationship graph estimating unit 604 determines whether the identified type is the same as or close to the instructed type of a dominance relationship graph. Subsequently, a member with the identified type determined to be the instructed type of the dominance relationship graph is temporarily selected.

(Step S303) The member selecting unit 80 calculates member vectors $g_t^{(1)}(i)$ (i is an integer between 1 and N) in which the determined members and the temporarily selected member are included as the members.

(Step S304) A conditional utterance amount estimating unit 601 calculates an amount of conditional utterances $a^-_t$ from the calculated member vectors $g_t^{(1)}(i)$.

(Step S305) The conditional utterance amount estimating unit 601 selects members who the amount of conditional utterances $a^-_t$ is a first threshold value or more when the determined members and the temporarily selected member are included as the members.

(Step S306) The interrupt matrix estimating unit 602 calculates an interrupt matrix $O^-_t$ from the calculated member vectors $g_t^{(1)}(i)$.

(Step S307) The interrupt matrix estimating unit 602 selects members who values obtained by converting an interrupt matrix $O^-$ when the determined members and the temporarily selected member are included as the members into scalar values are a second threshold value or more.

(Step S308) The activity probability estimating unit 603 calculates activity probability $Q^-_t$ from the calculated member vectors $g_t^{(1)}(i)$.

(Step S309) The activity probability estimating unit 603 selects members who values obtained by converting activity probability $Q^-_t$ when the determined members and the temporarily member are included as the member into scalar values are a third threshold value or more.

(Step S310) The member selecting unit 80 compares the calculated values (the amount of conditional utterances $a^-_t$, the values obtained by converting the interrupt matrix $O^-_t$ into the scalar values, and the values obtained by converting the activity probability $Q^-_t$ into the scalar values) with predetermined corresponding values. The member selecting unit 80 selects, for example, one member with the largest differences with respect to threshold values. The member selecting unit 80 sets, for example, a flag of information indicating the selected member to 1 for information stored in the conference data storing unit 40.

(Step S311) The member selecting unit 80 determines whether the selecting of the member has been completed. The member selecting unit 80 resets the flag of information indicating the member who the flag is set to 1 in Step S310 when it is determined that the selecting of the member has been complete (Step S311; YES) and a process thereof proceeds to Step S7. Alternatively, the member selecting unit 80 returns to Step S4 when it is determined that the selecting of the member has not been complete (Step S311; NO).

(Steps S7 and S8) The member selecting unit 80 performs Steps S7 and S8.

For example, as shown in FIG. 11, when the determined members are members with ID7 to ID9 and the other members who can participate are members with ID1 to ID6, the dominance relationship graph estimating unit 604 selects the members with ID1, ID2, ID5, and ID6 as members with a constitution associated with a designated dominance relationship graph.

Also, the conditional utterance amount estimating unit 601 estimates amounts of conditional utterances when the determined members with ID7 to ID9 and one of the members with ID1, ID2, ID5, and ID6 are included as the members and selects members who the amounts of conditional utterances are the first threshold value or more among the estimated results. Here, it is assumed that the conditional utterance amount estimating unit 601 selects the members with ID5 and ID6.

Subsequently, the interrupt matrix estimating unit 602 estimates an interrupt matrix when the determined members with ID7 to ID9 and one of the members with ID1, ID2, ID5, and ID6 are included as the members and selects members who values obtained by converting the interrupt matrix into scalar values are the second threshold value or more among the estimated results. Here, it is assumed that the interrupt matrix estimating unit 602 selects the members with ID1 and ID6.

Subsequently, the activity probability estimating unit 603 estimates activity probability when the determined members ID7 to ID9 and one of the members with ID1, ID2, ID5, and ID6 are included as the members and selects members who values obtained by converting activity probabilities into scalar values are the third threshold values or more among the estimated results. Here, it is assumed that the interrupt matrix estimating unit 602 selects the members with ID1 and ID5.

Subsequently, the member selecting unit 80 compares the calculated values (the amounts of conditional utterances, the values obtained by converting the interrupt matrix into the scalar values, and the values obtained by converting the activity probabilities into the scalar values) with predetermined corresponding threshold values and selects one member with the largest differences with respect to the threshold values. Thus, the member selecting unit 80 selects the member with ID1 as a member.

The estimating unit 60 and the member selecting unit 80 perform such a process once more and selects another member.

In this way, in this embodiment, candidates can be sequentially narrowed down by selecting members with values higher than predetermined threshold values.

Note that a program for realizing functions of a conversation member optimization apparatus 1 in this embodiment may be recorded on a computer-readable recording medium, the program recorded on the recording medium may be read in a computer system, and members who participate in a conference to be held may be selected by executing the program. Note that a "computer system" mentioned herein is assumed to include an operating system (OS) and hardware such as peripheral apparatuses. Moreover, a "computer system" is also assumed to include a WWW system including a home page providing environment (or a display environment).

A "computer-readable recording medium" refers to a storage apparatus such as a flexible disk, a magnetic optical disk, a read only memory (ROM), and a compact disc-read only memory (CD-ROM), a hard disk built into a computer system, and the like. In addition, a "computer-readable recording medium" is assumed to include a medium configured to hold a program for a certain period of time like a volatile memory (a random access memory (RAM)) inside a computer system serving as a server or a client when a program is transmitted over a network such as the Internet or a communication circuit such a telephone circuit.

The program may be transmitted from a computer system that stores the program in a storage apparatus or the like to another computer via a transmission medium or through a transmission wave in a transmission medium. Here, the "transmission medium" for transmitting the program refers to a medium having a function of transmitting information like a network (a communication network) such as the Internet or a communication circuit (a communication line) such as a telephone line. The program may be used to realize some of the above-described functions. In addition, the above-described program may be a so-called differential file (a differential program) in which the above-described functions can be realized using a combination of the program and a program recorded in a computer system in advance.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A conversation member optimization apparatus, comprising:
   a terminal configured to acquire acoustic signals of a conference and output the acquired acoustic signals to a channel of sound signals; and
   at least one processor programmed to function as:
   a conversation analyzing unit configured to recognize sound signals from the channel of sound signals output by the terminal in a plurality of recorded conferences held in the past for each conference and analyze conversations in the conferences for each conference;
   an estimating unit configured to estimate feature quantities in combinations of members who will participate in a conference to be held on the basis of results analyzed by the conversation analyzing unit and in accordance with a member selecting instruction used to select members to participate in the conference to be held; and
   a member selecting unit configured to select the members on the basis of the results estimated by the estimating unit and to communicate the members selected to an output apparatus that outputs the members selected to a user,
   wherein the feature quantities include at least one of:
     an amount of conditional utterances serving as an amount of utterances according to a combination of one member and another member,
     an interrupt matrix indicating whether another member interrupts and one member speaks, and
     activity probability serving as probability of another member speaking after one member,
   wherein the member selecting instruction includes the total number of participating members in the conference to be held and determination information indicating at least one member who is determined to participate in advance among participating members in the conference to be held,
   members other than the member who is determined to participate in advance are candidates for selectable members,
   the feature quantities include at least the amount of conditional utterances, and
   the estimating unit repeatedly performs selection until the one member among the members who are the candidates is included in the total number of participating members in the conference to be held so that the amount of conditional utterances when participating members in the conference to be held are combined with members who are candidates to be selected are combined one by one is maximized.

2. A conversation member optimization apparatus, comprising:
   a terminal configured to acquire acoustic signals of a conference and output the acquired acoustic signals to a channel of sound signals; and
   at least one processor programmed to function as:
   a conversation analyzing unit configured to recognize sound signals from the channel of sound signals output by the terminal in a plurality of recorded conferences held in the past for each conference and analyze conversations in the conferences for each conference;
   an estimating unit configured to estimate feature quantities in combinations of members who will participate in a conference to be held on the basis of results analyzed by the conversation analyzing unit and in accordance with a member selecting instruction used to select members to participate in the conference to be held; and
   a member selecting unit configured to select the members on the basis of the results estimated by the estimating unit and to communicate the members selected to an output apparatus that outputs the members selected to a user, wherein the feature quantities include:
- an amount of conditional utterances serving as an amount of utterances according to a combination of one member and another member,
- an interrupt matrix indicating whether another member interrupts and one member speaks, and
- activity probability serving as probability of another member speaking after one member, wherein the member selecting instruction includes the total number of participating members in the conference to be held and determination information indicating at least one member who is determined to participate in advance among participating members in the conference to be held, members other than the member who is determined to participate in advance are candidates for selectable members, and the estimating unit repeatedly performs selection until the one member among the members who are the candidates is included in the total number of participating members in the conference to be held so that the amounts of conditional utterances when participating members in the conference to be held are combined with members who are candidates to be selected are combined one by one and sums of values obtained by converting the interrupt matrix into scalar values and values obtained by converting the activity probability into scalar values are maximized.

3. The conversation member optimization apparatus according to claim 2, wherein the estimating unit selects a function used for converting the interrupt matrix into scalar values in accordance with selection conditions included in the member selecting instruction when the interrupt matrix is converted into the scalar values.

4. A conversation member optimization apparatus, comprising:
- a terminal configured to acquire acoustic signals of a conference and output the acquired acoustic signals to a channel of sound signals; and
- at least one processor programmed to function as:
  - a conversation analyzing unit configured to recognize sound signals from the channel of sound signals output by the terminal in a plurality of recorded conferences held in the past for each conference and analyze conversations in the conferences for each conference;
  - an estimating unit configured to estimate feature quantities in combinations of members who will participate in a conference to be held on the basis of results analyzed by the conversation analyzing unit and in accordance with a member selecting instruction used to select members to participate in the conference to be held; and
  - a member selecting unit configured to select the members on the basis of the results estimated by the estimating unit and to communicate the members selected to an output apparatus that outputs the members selected to a user, wherein the feature quantities include:
- an amount of conditional utterances serving as an amount of utterances according to a combination of one member and another member,
- an interrupt matrix indicating whether another member interrupts and one member speaks, and
- activity probability serving as probability of another member speaking after one member, wherein the member selecting instruction includes the total number of participating members in the conference to be held and determination information indicating at least one member who is determined to participate in advance among participating members in the conference to be held, members other than the member who is determined to participate in advance are candidates for selectable members, the estimating unit selects a member for whom the amounts of conditional utterances when participating members in the conference to be held are combined with members who are candidates to be selected are combined one by one are a first threshold value or more, selects a member for whom the values obtained by converting the interrupt matrix into the scalar values when participating members in the conference to be held are combined with members who are candidates to be selected are combined one by one are a second threshold value or more, and selects a member for whom the values obtained by converting the activity probability into the scalar values when participating members in the conference to be held are combined with members who are candidates to be selected are combined one by one are a third threshold value or more, and wherein the member selecting unit repeatedly performs selection until the one member among the members who are the candidates is included in the total number of participating members in the conference to be held on the basis of the results selected by the estimating unit.

* * * * *